United States Patent
Yamada et al.

(10) Patent No.: US 6,647,082 B1
(45) Date of Patent: Nov. 11, 2003

(54) MANUFACTURING METHOD AND DEVICE OF CONTROL RODS FOR NUCLEAR REACTORS

(75) Inventors: Yuji Yamada, Ayase (JP); Masataka Tamura, Yokahama (JP); Seiichiro Kimura, Inagi (JP); Toshihiro Suenaga, Yokohama (JP); Masahirou Araya, Yokohama (JP); Yuichi Tongu, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/525,941

(22) Filed: Mar. 15, 2000

(30) Foreign Application Priority Data

Mar. 16, 1999 (JP) .............................. 11-069908
Feb. 28, 2000 (JP) ....................... 2000-051779

(51) Int. Cl.[7] ................................ G21C 7/00
(52) U.S. Cl. ................. 376/260; 376/327; 376/333
(58) Field of Search .................. 376/333, 327, 376/260; 219/121.63, 121.67; 419/66

(56) References Cited

U.S. PATENT DOCUMENTS

| | | | | |
|---|---|---|---|---|
| 3,115,452 A | * | 12/1963 | Rock ............................ | 376/327 |
| 4,691,093 A | * | 9/1987 | Banas et al. ............ | 219/121.63 |
| 4,694,136 A | * | 9/1987 | Kasner et al. .......... | 219/121.64 |
| 4,759,904 A | * | 7/1988 | Gillett et al. ................. | 376/353 |
| 4,876,060 A | * | 10/1989 | Yoshioka et al. ............. | 376/333 |
| 4,925,620 A | * | 5/1990 | Aiello et al. ................. | 376/260 |
| 5,079,825 A | * | 1/1992 | Matsui et al. ................... | 29/520 |
| 5,118,468 A | * | 6/1992 | Boutin et al. ................... | 419/66 |
| 5,359,172 A | * | 10/1994 | Kozak et al. ........... | 219/121.64 |
| 5,961,858 A | * | 10/1999 | Britnell .................. | 219/121.63 |
| 6,028,906 A | * | 2/2000 | Kawashima et al. ......... | 376/260 |
| 6,041,091 A | * | 3/2000 | Ueda et al. .................. | 376/327 |
| 6,137,854 A | * | 10/2000 | Ueda et al. .................. | 376/333 |
| 6,191,383 B1 | * | 2/2001 | Jense .......................... | 219/121 |
| 6,201,211 B1 | * | 3/2001 | Emmelmann ........... | 219/121.63 |
| 6,285,728 B1 | * | 9/2001 | Ueda et al. .................. | 376/327 |
| 6,288,359 B1 | * | 9/2001 | Koch et al. ............. | 219/121.63 |
| 6,326,586 B1 | * | 12/2001 | Heyerick et al. ....... | 219/121.67 |
| 6,365,872 B1 | * | 4/2002 | Arduino et al. ......... | 219/121.72 |
| 6,399,915 B1 | * | 6/2002 | Mori et al. ............. | 219/121.83 |

FOREIGN PATENT DOCUMENTS

JP  7-229997  8/1995
JP  9-166680  6/1997

* cited by examiner

*Primary Examiner*—Michael J. Carone
*Assistant Examiner*—Daniel Matz
(74) *Attorney, Agent, or Firm*—Oblon, Spivak, McClelland, Maier & Neustadt, P.C.

(57) ABSTRACT

A method for manufacturing a control rod of a nuclear reactor, the control rod having a blade including neutron absorbers and a sheath, a tie rod for fixing the blade, a handle and a lower-blade fixed to the tie rod and the blade. The method includes a first step for cutting weep holes for water to cool the neutron absorbers in the sheath and cutting a periphery of the sheath, a second step for bending the sheath cut in the first step to a C-shape, a third step for inserting the neutron absorbers in a bent portion of the sheath formed by bending in the second step, a fourth step for successively welding the blade to the tie rod, the blade to the handle and the blade to the lower-blade, and a fifth step for finishing portions welded in the fourth step.

8 Claims, 18 Drawing Sheets

| OUTPUT (W) | CONVERGENCE DIAMETER (mm) | PEAK OUTPUT (W) | FREQUENCY (Hz) | DUTY (%) | PROCESS SPEED (m/min) | LENS (INCH) |
|---|---|---|---|---|---|---|
| 500~2000 | 0.5~1.0 | 500~2000 | 10~1000 | 10~60 | 0.1~10 | 5~10 |

FIG. 5A

| OUTPUT (W) | CONVERGENCE DIAMETER (mm) | PROCESS SPEED (m/min) | LENS (INCH) |
|---|---|---|---|
| 500~2000 | 0.5~1.0 | 0.1~10 | 5~10 |

FIG. 5B

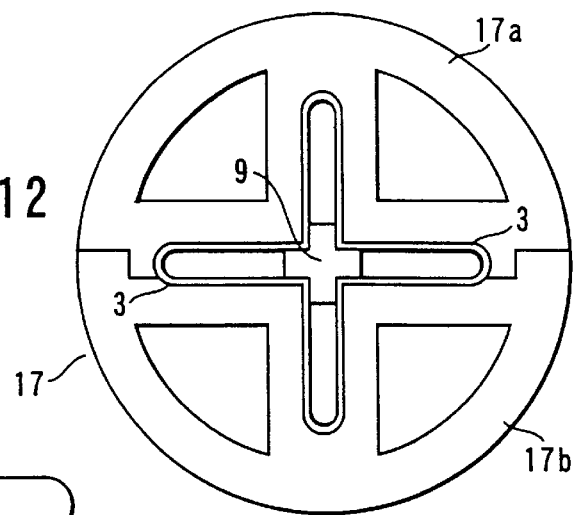
FIG. 12
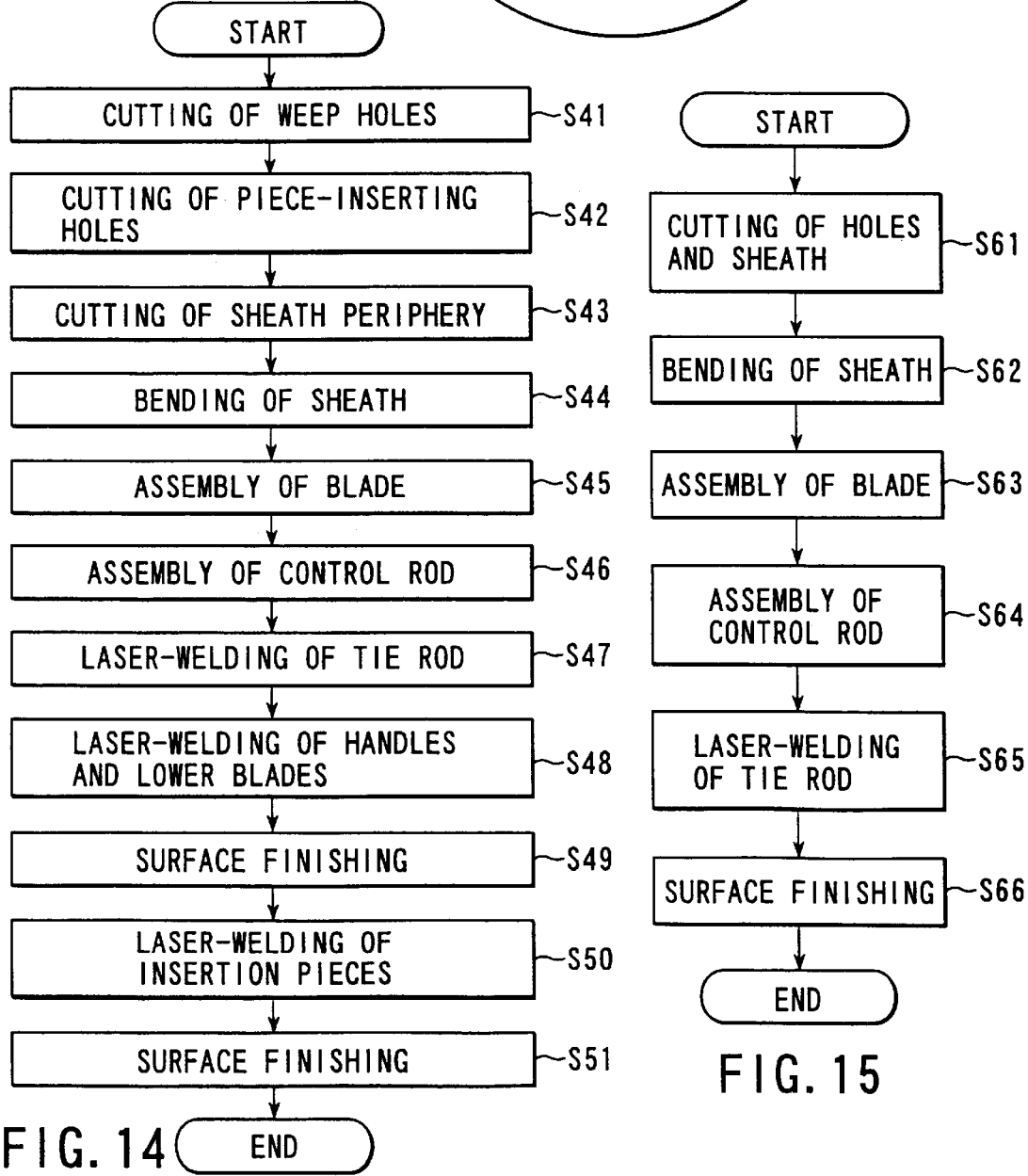
FIG. 14
FIG. 15

MANUFACTURING METHOD AND DEVICE OF CONTROL RODS FOR NUCLEAR REACTORS

BACKGROUND OF THE INVENTION

This application is based on Japanese Patent Application No. 11-69908 filed Mar. 16, 1999, and No. 2000-51779 filed Feb. 28, 2000, the contents of which are cited herein by reference.

The present invention relates to a method and apparatus for manufacturing a control rod for a nuclear reactor, the parts of the control rod are adhered to one another by laser welding or TIG welding.

FIG. 1 schematically shows an example of the internal structure of a reactor pressure vessel (RPV) of a boiling water reactor (BWR).

Referring to FIG. 1, water as a coolant is heated and boiled, while flowing upward from a bottom portion of a reactor core through a gap between fuel rods 1 containing fuel. Power of the reactor varies in accordance with withdrawal or insertion of a control rod 2. The reactivity is increased when the control rod 2 is withdrawn. The reactivity is decreased when the control rod 2 is inserted.

An example of the structure of the control rod 2 will be described with reference to a schematic perspective view of FIG. 2A. As shown in FIG. 2A, the control rod 2 mainly comprises blades 3, a handle 4 attached to the upper ends of the blades 3 and lower-blades 5 attached to the lower ends of the blades 3. More specifically, the blade 3 comprises neutron absorbers 6, a sheath 7 housing them and insertion pieces 8 inserted for the purpose of securing a portion to allow water to flow between the neutron absorbers 6 in the sheath 7.

Four of the blades 3 make a set, and the adhesion ends of the respective blades are connected to a tie rod so as to form a cross shape as a whole.

Conventionally, the control rod 2 of the reactor is manufactured by the following method. FIGS. 3A and 3B show examples of processes for manufacturing the control rod 2.

First, a process for manufacturing the control rod 2 using boron carbide ($B_4C$) as the neutron absorbers 6 will be described with reference to the flowchart of FIG. 3A.

In this case, first, the periphery of the sheath 7 is cut (S1), and weep holes are formed by cutting (S2). Thereafter, the sheath 7 is bent like a C-shape (S3). After the ends of the C-shaped sheath 7 are aligned, a tube containing boron carbide as the neutron absorbers 6 is inserted in the sheath 7 (S4). Thus, the blade 3 is assembled.

The blades 3 are fixed to the tie rod 9, with the result that the control rod 2 is assembled (S5). Thereafter, welding of the tie rod 9 (S6) and welding of the handles 4 and the lower-blades 5 (S7) are carried out. Finally, the control rod 2 is smoothed by finishing with a wire brush or the like (S8).

No insertion piece 8 is employed in the control rod 2 which uses $B_4C$ as the neutron absorbers 6.

In the above case, $B_4C$ is used as the neutron absorbers 6. Next, the control rod 2 using hafnium (Hf) as the neutron absorbers 6 will be described.

In this case, as shown in FIG. 3B, the periphery of the sheath 7 is cut first (S11), and weep holes are formed by cutting (S12). Thereafter, the sheath 7 is bent like a C-shape (S13). After the ends of the C-shaped sheath 7 are aligned, piece-inserting holes through which the insertion pieces 8 are inserted inside the C shape is formed by cutting (S14). Thereafter, an Hf plate as the neutron absorbers 6, and the insertion pieces 8 are inserted in the sheath 7, thereby assembling the blade 3 (S15). The sheath 7 and the insertion pieces 8 are welded together (S16) and finishing with a wire brush is carried out (S17), thus producing the blade 3.

Further, the tie rod 9, the handles 4 and the lower-blades 5 are combined with the blades 3 produced by the above method, with the result that the control rod 2 is assembled (S18). Thereafter, welding of the handles 4 and the lower-blades 5 (S20) are carried out. Finally, the control rod 2 is finished with a wire brush (S21).

In the case where the control rod 2 of the reactor is manufactured as described above, first, the sheath 7 is cut and bent, and thereafter the blade 3 is assembled. Then, the frames of the tie rod 9, the handles 4 and the lower-blades 5 are assembled. Further, welding of the blades 3, the tie rod 9, the handles 4 and the lower-blades 5 and welding of the sheath 7 and the insertion pieces 8 are carried out.

Conventionally, welding of these parts is performed by manual TIG welding. The TIG welding is a method in which arc is generated between a nonconsumable tungsten electrode and a base material in an inert gas atmosphere for the purpose of melting.

According to the manual TIG welding, since heat input is great, deformation after the process is great, and in particular, welding deformation is considerable. Therefore, welding is frequently performed while the deformation is corrected. In addition, since the process speed of welding is low, the productivity is low.

BRIEF SUMMARY OF THE INVENTION

An object of the present invention is to provide a method and apparatus for manufacturing a control rod for a nuclear reactor, by reducing heat input to suppress deformation after the process and increasing welding speed to improve the productivity.

The above object is obtained by the invention as described below.

(1) In a method for manufacturing a control rod for a nuclear reactor comprising blades including neutron absorbers, insertion pieces and a sheath, weep holes and piece-inserting holes are formed in the sheath by cut working and the periphery is cut. Thereafter, the neutron absorbers and the insertion pieces are inserted in a recess portion formed by bending the sheath. The piece-inserting holes and the insertion pieces are welded together by a laser beam, thereby forming an integral blade. The blades and handles are welded by a laser beam, and subsequently, the blades and lower-blades are welded by a laser beam. Then, the welded portions are surface-finished by a wire brush or the like.

(2) In a method for manufacturing a control rod for a nuclear reactor comprising blades including neutron absorbers and a sheath, weep holes are formed in the sheath by cut working. After the periphery is cut, the neutron absorbers are inserted in a recess portion formed by bending the sheath, thereby forming an integral blade. The blades and handles are welded by a laser beam, and subsequently, the blades and lower-blades are welded by a laser beam. Then, the welded portions are surface-finished by a wire brush or the like.

With the method for manufacturing a control rod described above, the heat input in the welding time is kept low and the deformation after the process is suppressed. Moreover, since the process speed of welding is increased, the productivity can be improved.

(3) In the welding time, to reliably melt a groove line and secure the penetration bead on the rear surface of the sheath, a YAG laser beam or a CO2 laser beam is irradiated on a position located immediately above a groove position or a position deviated in parallel from the groove position within a range of 2 mm. The laser beam may be irradiated several times so as to lap over one another, shifted within a range of 0.1 to 2.0 mm from a first pass or a first pass target position. Alternatively, the laser beam is irradiated while traveling forward with circular motion in a diameter within 2 mm. To produce circular motion of the laser beam, a prism is inserted before a condenser lens, and while the prism is rotating on an axis of the laser beam, the laser beam is irradiated on the rotating prism. As a result, the laser beam is incident on the condenser lens, while rotating.

With the above method, in any case, the groove line is reliably melted and the penetration bead on the rear surface is secured.

(4) As another method, in the step for welding the blade to the tie rod, the blade to the handle or the blade to the lower-blade, two slits are provided in the tie rod, the handle or the lower-blade, and projections of the blade is inserted in the slits. The laser beam is irradiated on a boundary between the blade and the tie rod, a boundary between the blade and the handle or a boundary between the blade and the lower-blade.

With the above method, in any case, the groove line is reliably melted and the penetration bead on the rear surface is secured. In addition, the groove line is not deviated due to the work accuracy of the blade. Therefore, the laser beam is reliably irradiated on the groove line.

(5) A CCD camera is mounted on the work head, and the CCD camera in its entirety is moved to the groove position as designed. An image near the welding portion is picked up by the CCD camera. The image processing apparatus detects the actual groove position from the image, i.e., the coordinates of the center of the insertion piece from the groove position in the case of welding the piece-inserting hole of the sheath and the insertion piece. In the case of welding the blades and the tie rod, welding of the blades and the handles or welding of the blades and the lower-blades, the work start and end points of the welding are detected from the groove position. The arithmetic processing apparatus compares the actual groove position with the groove position as designed, and calculates the deviation of the irradiation position of the laser beam. After the work head is moved by a distance corresponding to the amount of the deviation of the irradiation position of the laser beam plus the amount of the offset of the work head and the CCD camera, the laser beam is irradiated.

With the above apparatus for manufacturing a control rod, even if there is a difference between the groove position as designed and the actual groove position, the groove line is melted reliably, the penetration bead on the rear surface of the sheath is secured, and the welding process can be automated.

In addition, since the heat input in the welding time is kept low, the deformation after the process is suppressed. Moreover, since the process speed of welding is increased, the productivity can be improved.

(6) In an apparatus for manufacturing a control rod of a nuclear reactor, the control rod comprising blades including neutron absorbers, an insertion pieces and a sheath or blades including neutron absorbers and a sheath, a tie rod for fixing the blade, a handle and a lower-blade fixed to the tie rod and the blade, there is provided a work table, a laser oscillator, a work head, a CCD camera, an image processing apparatus, an arithmetic processing apparatus, a servo motor and control means. The above apparatus comprises at least two work heads and two work tables and a movable mirror between the laser oscillator and the work heads.

The work table is used to set objects to be welded constituting the control rod and carry out welding. The laser oscillator outputs a YAG laser beam or CO2 laser beam. The work head has an optical system for transmitting the laser beam oscillated by the laser oscillator and converging it to the objects to be welded by a condenser lens. The CCD camera, mounted on the work head, picks up an image of a portion near a groove of the objects to be welded. The image processing apparatus detects a groove position from the image picked up by the CCD camera. The arithmetic processing apparatus compares the groove position obtained by the image processing apparatus with a groove position as designed, and calculates deviation therebetween. The servo motor moves the work head or the work table by a distance corresponding to an amount of the deviation of the groove position calculated by the arithmetic processing means plus an amount of the offset of the work head and the CCD camera. The control means drives and controls the servo motor.

With the above apparatus for manufacturing a control rod, the welding process can be automated. Further, since the groove position is adjusted, the groove line is reliably melted, the penetration bead on the rear surface of the sheath is secured and the welding process can be automated. In addition, the heat input is kept low and the deformation after the process is suppressed. Moreover, since the process speed of welding is increased, the productivity can be improved.

(7) In a method for manufacturing a control rod for a nuclear reactor, weep holes and piece-inserting holes are formed in the sheath by cut working and the periphery is cut. Thereafter, the neutron absorbers and the insertion pieces are inserted in a recess portion formed by bending the sheath. The piece-inserting holes and the insertion pieces are welded together by TIG welding, thereby forming an integral blade. The blades and handles are welded by TIG welding, and subsequently the blades and lower-blades are welded by TIG welding. Then, the welded portions are surface-finished by a wire brush or the like.

With the method for manufacturing a control rod described above, the heat input in the welding time is kept low and the deformation after the process is suppressed. Further, if two welding torches are used simultaneously, the productivity can be improved.

(8) In the welding time, to reliably melt a groove line and secure the penetration bead on the rear surface of the sheath, automatic TIG welding is carried out at a position located immediately above a groove or a position deviated in parallel from the groove within a range of 3 mm.

With the above method, in any case, the groove line is reliably melted and the penetration bead on the rear surface of the sheath is secured.

(9) A CCD camera is mounted on the work head, and the CCD camera in its entirety is moved to the groove position as designed. An image near the welding portion is picked up by the CCD camera. The image processing apparatus detects the actual groove position from the image, i.e., the coordinates of the center of the insertion piece from the groove position in the case of welding the piece-inserting hole of the sheath and the insertion piece. In the case of welding the blades and the tie rod, welding of the blades and the handles or welding of the blades and the lower-blades, the work start and end points of the welding are detected from the groove position. The arithmetic processing apparatus compares the actual groove position with the groove position as designed, and calculates the deviation of the welding torch. After the welding torch is moved by a distance corresponding to the amount of the deviation of the welding torch plus the amount of the offset of the welding torch and the CCD camera, TIG welding is carried out.

With the above apparatus for manufacturing a control rod, even if there is a difference between the groove position as designed and the actual groove position, the groove line is melted reliably, the penetration bead on the rear surface of the sheath is secured, and the welding process can be automated.

In addition, since the welding speed is stabilized, the heat input in the welding time is kept low, with the result that the deformation after the process is suppressed. Moreover, when two welding torches are used simultaneously, the productivity can be improved.

(10) In an apparatus for manufacturing a control rod of a nuclear reactor, the control rod comprising blades including neutron absorbers, insertion pieces and a sheath, a tie rod for fixing the blade, a handle and a lower-blade fixed to the tie rod and the blade, the blade is sandwiched between chillers made of two metal plates having openings only at welding groove portions so that a TIG welding torch can access thereto. With this structure, since heat generated by welding is absorbed, welding deformation can be considerably suppressed.

(11) In an apparatus for manufacturing a control rod of a nuclear reactor, the control rod comprising a blade including neutron absorbers, insertion pieces and a sheath, a tie rod for fixing the blade, a handle and a lower-blade fixed to the tie rod and the blade, there is provided a work table, a TIG torch, a CCD camera, an image processing apparatus, an arithmetic processing apparatus, a servo motor and control means. The above apparatus comprises at least two TIG torches and two work tables.

The work table is used to set objects to be welded constituting the control rod and carry out welding. The CCD camera, mounted on the TIG welding torch, picks up an image of a portion near a groove of the objects to be welded. The image processing apparatus detects a groove position from the image picked up by the CCD camera. The arithmetic processing apparatus compares the groove position obtained by the image processing apparatus with a groove position as designed, and calculates a deviation therebetween. The servo motor moves the work head or the work table by a distance corresponding to an amount of the deviation of the groove position calculated by the arithmetic processing means plus an amount of the offset of the work head and the CCD camera. The control means drives and controls the servo motor.

With the above apparatus for manufacturing a control rod, the welding process can be automated. Further, since the groove position is adjusted, the groove line is reliably melted, the penetration bead on the rear surface is secured and the welding process can be automated. In addition, the heat input is kept low and the deformation after the process is suppressed. Moreover, if the two TIG torches are used simultaneously, the productivity can be improved.

(12) In the process of bending the sheath, since the end face of the side of the sheath that is connected to the tie rod tends to be ragged, the ragged portion is removed by laser cutting with high-pressure nitrogen gas, which can perform a process at a higher work speed than machining with a work accuracy equivalent to that of the machining. As a result, the productivity can be considerably improved.

(13) In the process of bending the sheath, since the end face of the side of the sheath that is connected to the tie rod tends to be ragged, the ragged portion is removed by shearing, which can perform processing by machining in a short period of time. As a result, the productivity can be considerably improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A and 5B are diagrams for explaining laser beam oscillating conditions;

FIG. 12 is a plan view showing a fixing jig of a state in which the blades and the tie rod are fixed thereto;

FIG. 14 is a flowchart for explaining a method for manufacturing a control rod for a nuclear reactor according to a second embodiment of the present invention;

FIG. 15 is a flowchart for explaining a method for manufacturing a control rod for a nuclear reactor according to a third embodiment of the present invention;

DETAILED DESCRIPTION OF THE INVENTION

Embodiments of the present invention will be described with reference to the drawings.

First Embodiment

Figure 1:
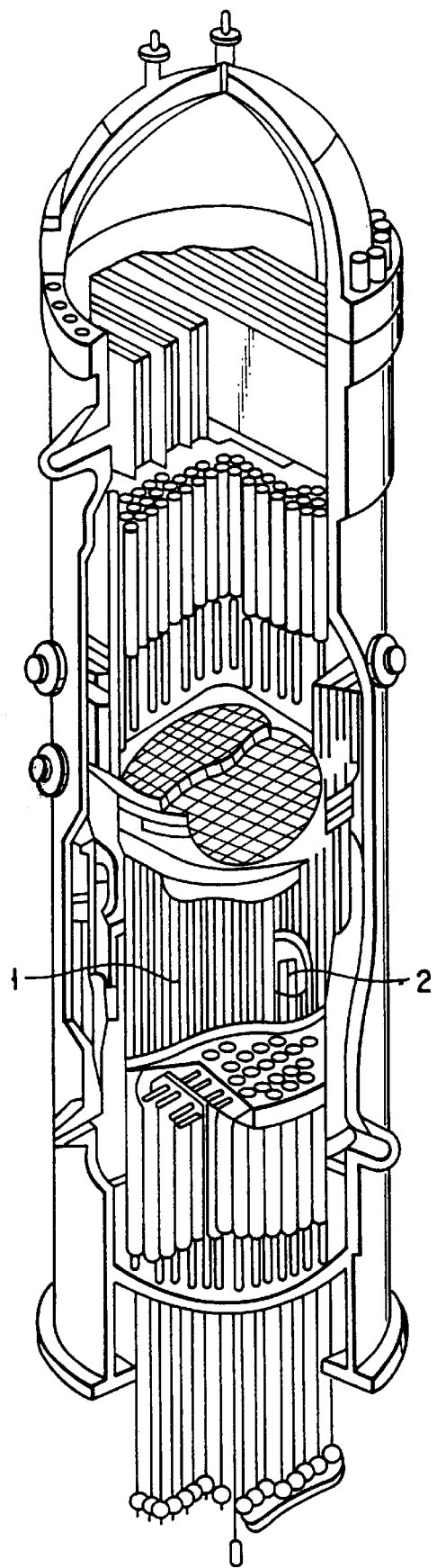
FIG. 1 is a bird's eye view showing an example of the internal structure of a reactor pressure vessel of a boiling water reactor.
Figures 2A, 2B:
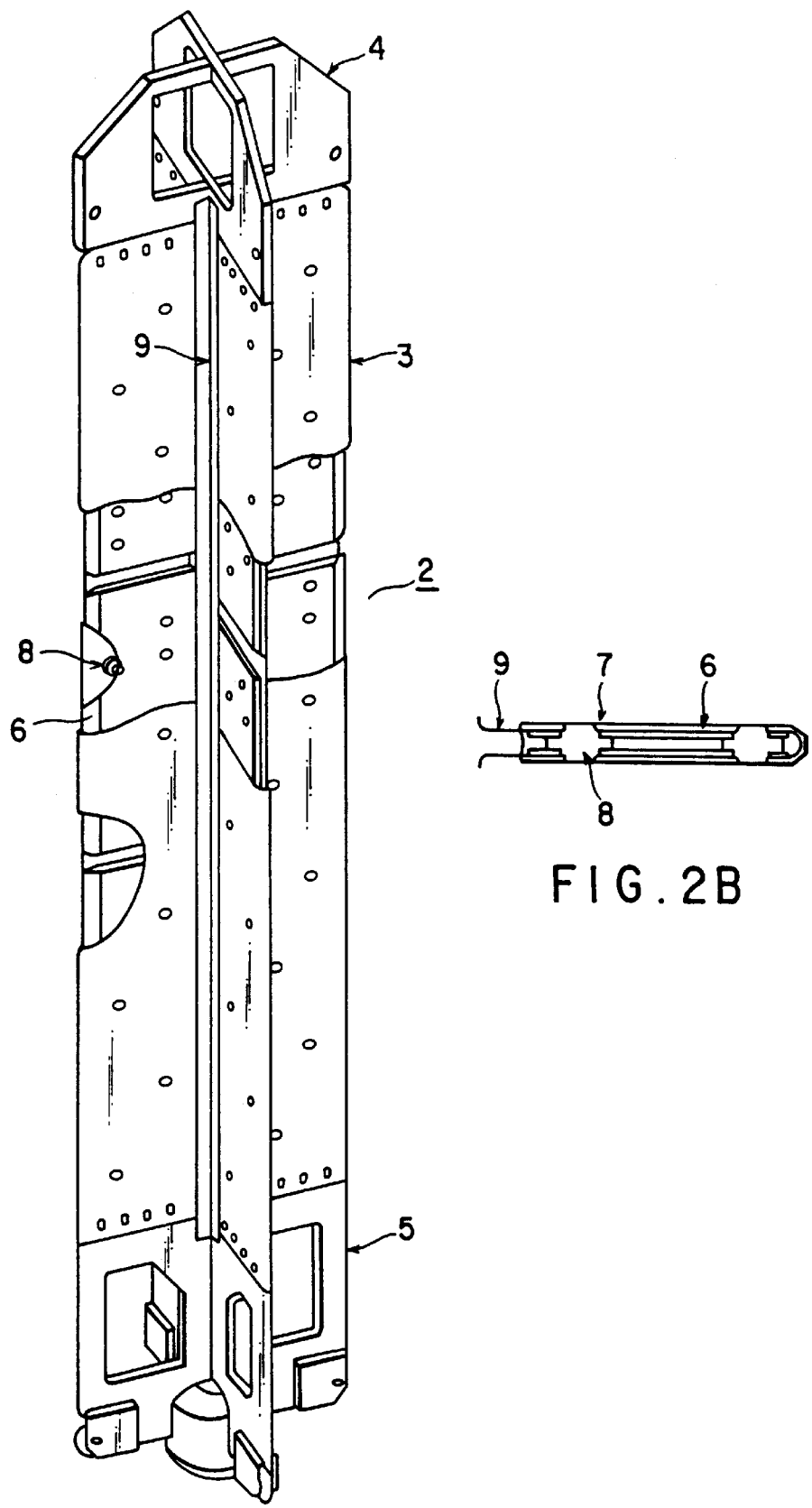
FIG. 2A is a perspective view for explaining the structure of a control rod.
FIG. 2B is a cross sectional view of a blade.
Figure 3A:
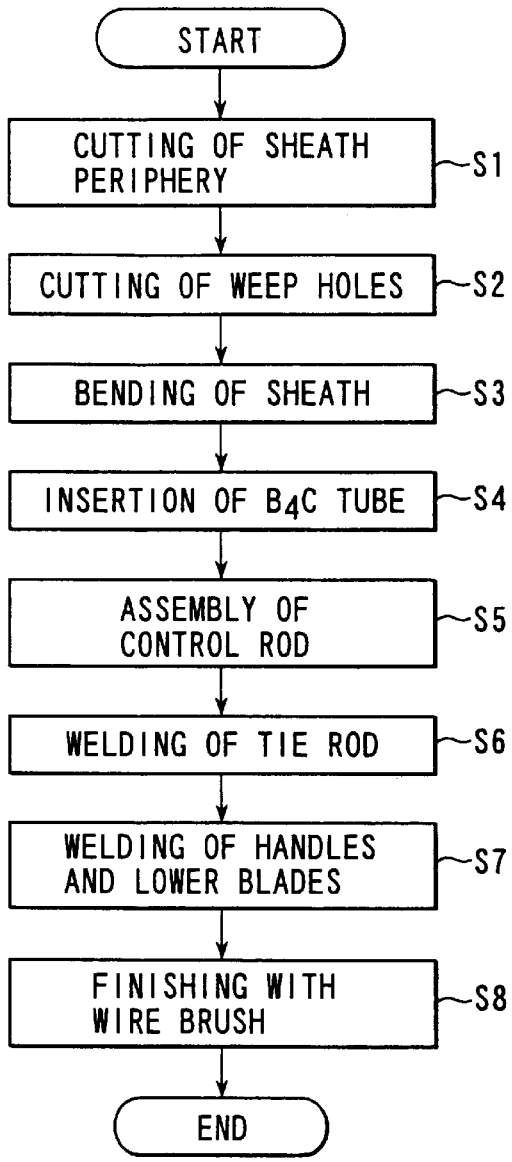
FIGS. 3A and 3B are flowcharts for explaining examples of processes of manufacturing a control rod for a nuclear reactor of the prior art.
Figure 3B:
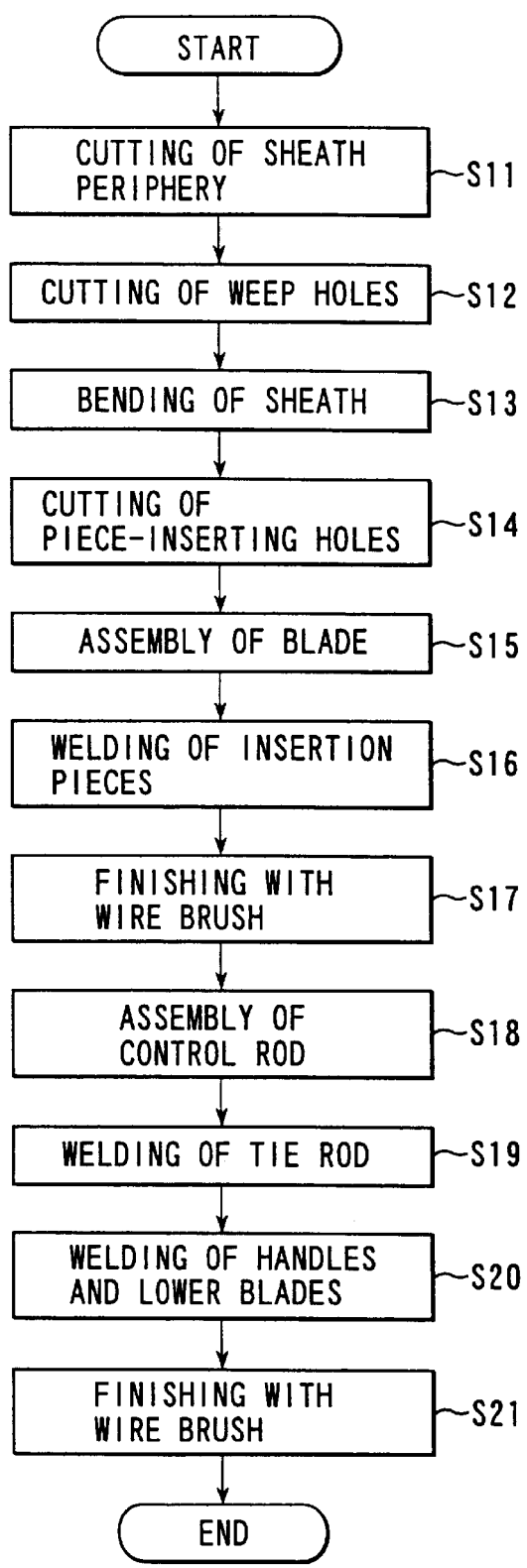
Figure 4:
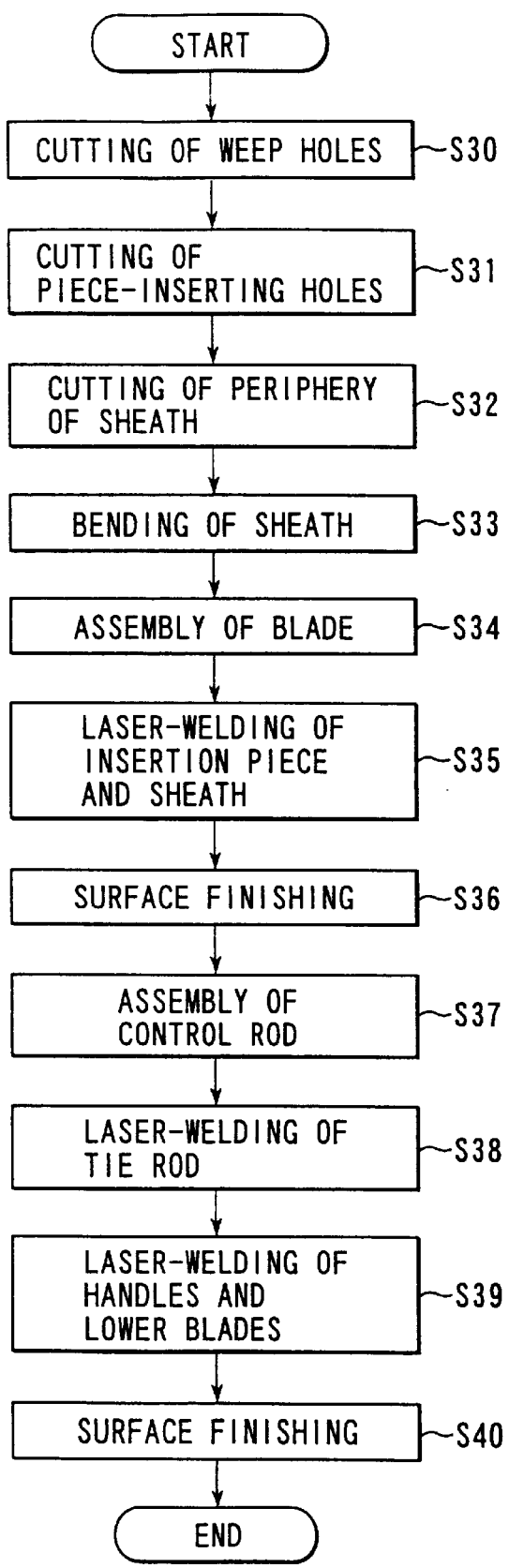
FIG. 4 is a flowchart for explaining a method for manufacturing a control rod for a nuclear reactor according to a first embodiment of the present invention.

FIG. 4 is a flowchart for explaining a method for manufacturing a control rod for a nuclear reactor according to a first embodiment of the present invention. Components of a control rod 2 are described with reference to FIG. 2. In this embodiment, Hf is used as neutron absorbers 6.

First, weep holes for cooling the neutron absorbers 6 (S30) and holes for setting insertion pieces 8 to secure a space between the neutron absorbers 6 and a sheath 7 (S31) are formed by cutting the sheath 7 by a laser beam. Thereafter, the periphery of the sheath 7 is cut (S32).

The laser beam with high-pressure nitrogen gas is used to cut the periphery of the sheath and the holes in order to keep the accuracy high. Holes may be made by punching or shearing instead of using a laser beam. After the cutting, it is preferable that scribing is performed by means of a laser beam to confirm the bent position.

Then, the sheath 7 is C-shaped by bending (S33). The insertion pieces 8 and the neutron absorbers 6 are inserted into the C shape, thereby assembling a blade 3 (S34). Thereafter, the insertion pieces 8 and the sheath 7 are welded by a laser beam (S35).

In this case, the insertion pieces 8 are used to fix the neutron absorbers 6 and secure a space between the sheath 7 and the neutron absorbers 6.

Examples of conditions for processing the insertion pieces 8 and the sheath 7 with a laser beam will be described with reference to FIGS. 5A and 5B.

FIG. 5A shows conditions in the case of pulse amplitude oscillation, and FIG. 5B shows conditions in the case of continuous oscillation. A YAG laser is used in both cases. Although welding tends to be stable in continuous oscillation, either oscillation may be applied.

FIGS. 6A to 6F schematically show laser irradiation positions. As indicated by the arrows in FIGS. 6A and 6B, the laser irradiation position is basically located immediately above a groove of the sheath 7 with which the insertion piece 8 is fit. However, it may be deviated from the groove within a range of 0.1 to 2.0 mm as indicated by the arrows in FIGS. 6C and 6D to secure a penetration bead.

Figure 6A:
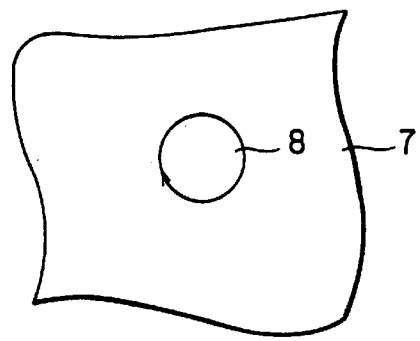
FIG. 6A is a front view showing a laser irradiation position or a TIG welding torch position.
Figure 6C:
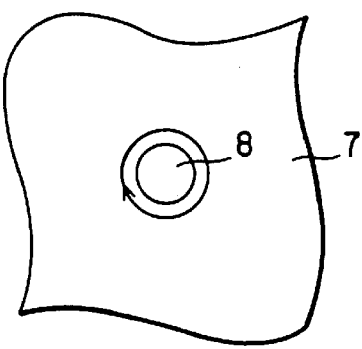
FIG. 6C is a front view showing a laser irradiation position or a TIG welding torch position.
Figure 6B:
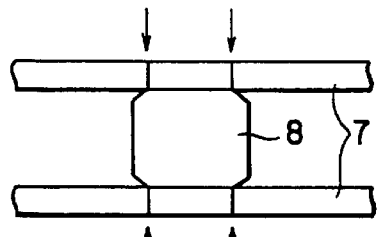
FIG. 6B is a cross-sectional view showing a laser irradiation position or a TIG welding torch position.
Figure 6D:
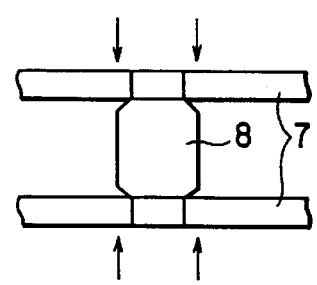
FIG. 6D is a cross-sectional view showing a laser irradiation position or a TIG welding torch position.
Figure 6E:
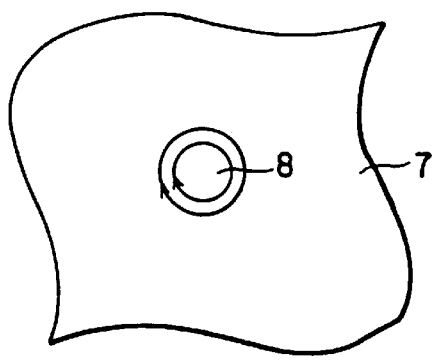
FIG. 6E is a front view showing a laser irradiation position or a TIG welding torch position.
Figure 6F:
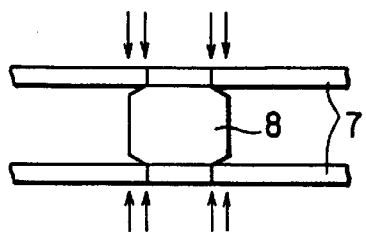
FIG. 6F is a cross-sectional view showing a laser irradiation position or a TIG welding torch position.

If the bead width is small, laser beams may be irradiated several times so as to lap over one another, immediately above the groove or in a range within 2 mm from the groove, as indicated by the arrows in FIGS. 6E and 6F. In this case, the laser beam is passed several times to lap over one another, shifted within a range of 0.1 to 2.0 mm from the first pass or the first pass target position.

Figure 7A:
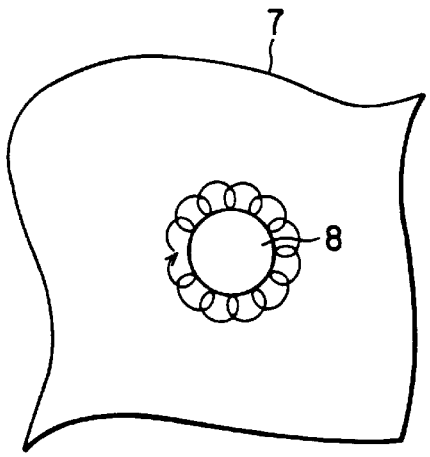
FIG. 7A is a front view showing a laser irradiation position, when the laser beam is rotated.
Figure 7B:
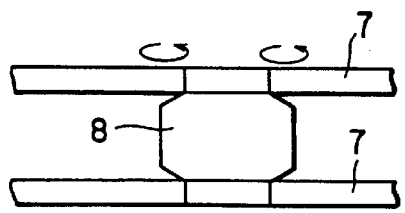
FIG. 7B is a cross-sectional view showing a laser irradiation position, when the laser beam is rotated.

FIGS. 7A and 7B schematically shows a laser irradiation position for radiating a laser beam with circular motion. As indicated by the arrows in FIGS. 7A and 7B, the sheath 7 in which the insertion pieces 8 are inserted is radiated with the laser beam traveling forward with circular motion in a diameter within 2 mm.

Through the methods shown in FIGS. 6A to 6F and FIGS. 7A and 7B, a wide and stable bead is obtained, the groove line is reliably melted, and the penetration bead on the rear surface is secured.

As another method for giving the circular motion to the laser beam, a work head or a work table may be mechanically rotated. However, when this mechanical method is employed and the process speed is increased to about several meters per minute, the circular motion may be distorted.

Figure 8:
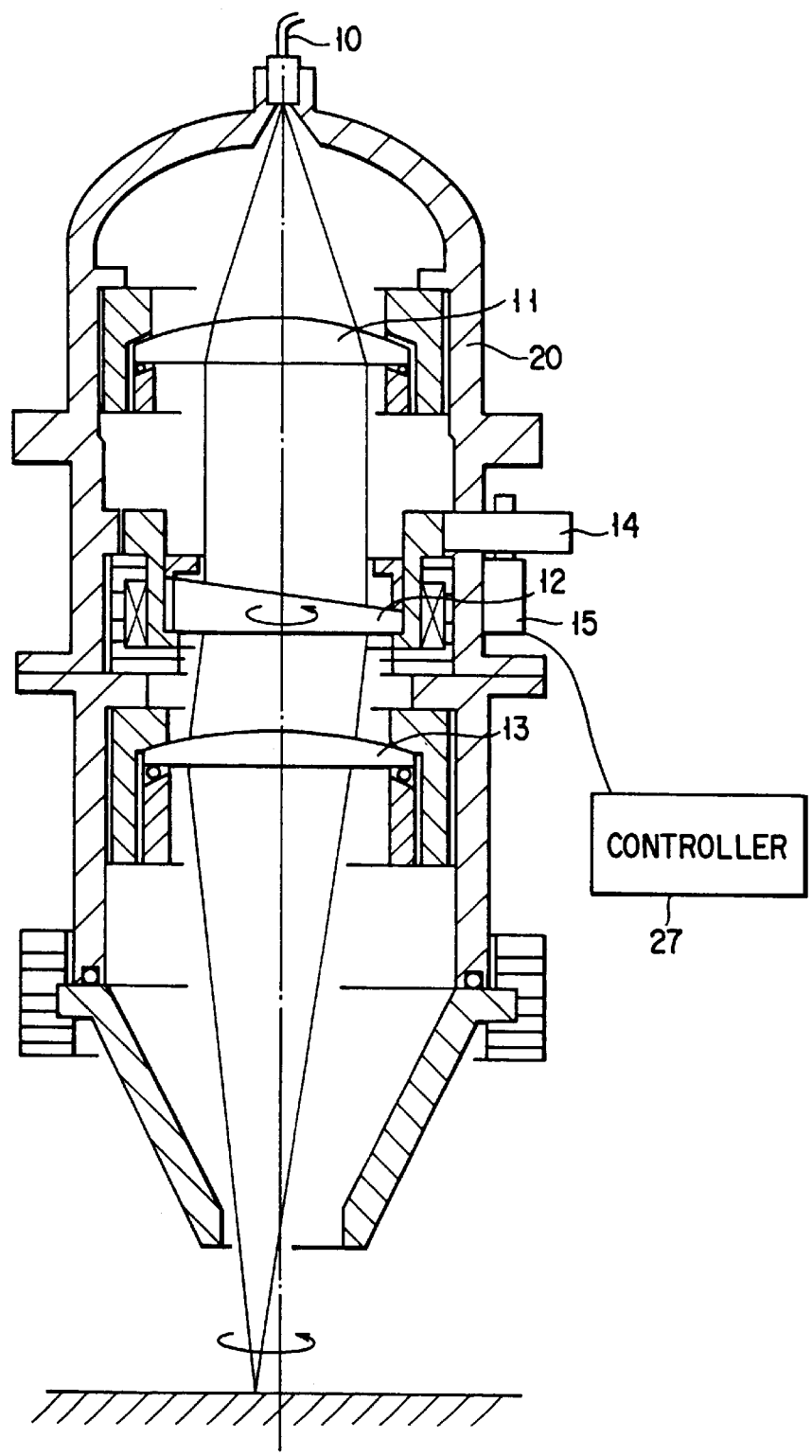
FIG. 8 is a cross-sectional view showing a schematic structure of an apparatus for rotating a YAG laser beam by means of a prism in the first embodiment.

FIG. 8 shows a schematic structure of an apparatus for rotating a laser beam by means of a prism.

Referring to FIG. 8, an optical fiber 10 for guiding a laser beam from a laser oscillator is connected to a laser incident portion of a work head 20. In the work head 20, a long focus lens 11, a prism 12 and a condenser lens 13 are held by holding members at suitable distances in this order from a laser input side to a laser output side. In this case, the holding member for holding the prism 12 is rotatably supported by a rotary member comprising a toothed portion on its circumferential surface. A gear 14 is rotated by a motor 15 mounted on the circumferential surface of the work head 20. The rotation can be transmitted to the rotary body via the toothed portion which meshes with the gear 14. The rotation speed of the prism 12 is controlled by a controller 27.

In this laser beam rotating apparatus, in the case of a YAG laser, a YAG laser beam is guided to the work head 20 through the optical fiber 10. In the work head 20, the laser beam is converted to a parallel beam by the long focus lens 11, guided to the prism 12 and then irradiated on the work surface through the condenser lens 13.

At this time, the prism 12 is rotated by rotating the gear 14 by means of the motor 15. As a result, the focus position is rotated at a high speed of several meters per minute within a range of several millimeters.

The structure in the case of a YAG laser is described above. In the case of a $CO_2$ laser also, the laser beam can be given circular motion by a similar laser beam rotating apparatus.

Figure 9:
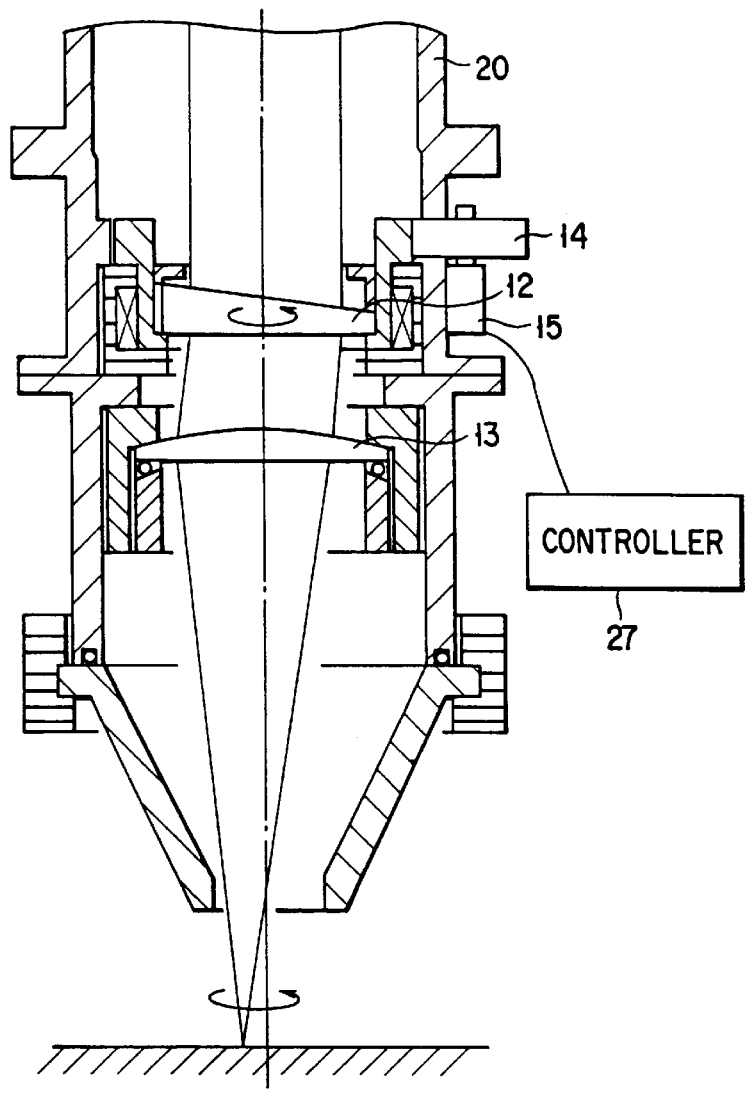
FIG. 9 is a cross-sectional view showing a schematic structure of an apparatus for rotating a $CO_2$ laser beam by means of a prism in the first embodiment.

FIG. 9 shows an example of the structure of a $CO_2$ laser, which is different from the structure of the YAG laser in that it does not have a long focus lens 11. The other portions of the structure is the same as those shown in FIG. 8.

A jig used in welding will be described with reference to FIGS. 10A and 10B.

Figure 10A:
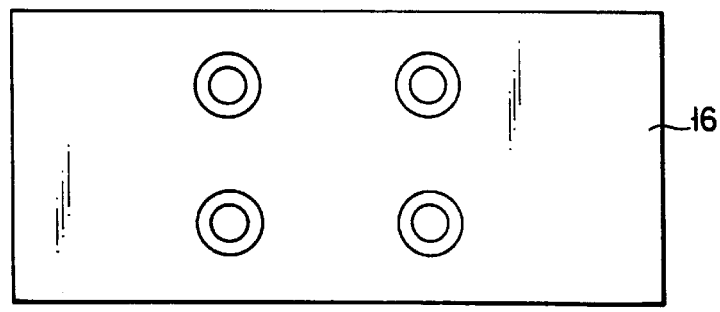
FIG. 10A is a plan view showing a fixing jig for use in welding in the first embodiment.
Figure 10B:
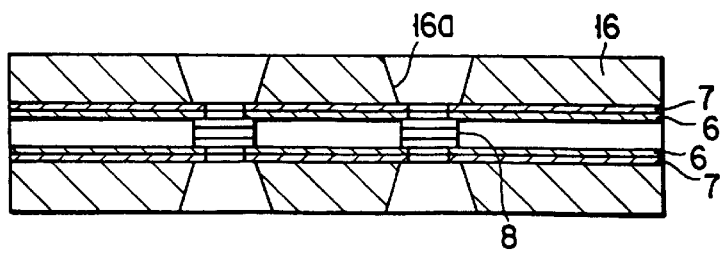
FIG. 10B is a cross-sectional view showing a fixing jig for use in welding in the first embodiment.

The jib in its entirety is formed of copper, as shown in FIGS. 10A and 10B. The jigs are arranged so as to sandwich the sheath 7 on the upper and lower surfaces thereof, and used as chillers 16 in the laser welding time. Inverted cone-shaped holes 16a are provided on both surfaces of the chillers 16 at positions corresponding to the positions of the insertion pieces 8, so that the work head 20 shown in FIG. 8 or 9 can access thereto when the insertion pieces 8 are welded.

The chillers 16 are also used in welding of a tie rod 9 (described later).

When the welding of the sheath 7 and the insertion pieces 8 is completed, the surface of the bead is smoothed with a wire brush (S36).

An integral structure storing the neutron absorbers 6 and the insertion pieces 8 in the sheath 7 is called a blade 3.

Then, four blades 3 are set to the tie rod 9, and handles 4 and lower-blades 5 are also set.

Figure 11A:
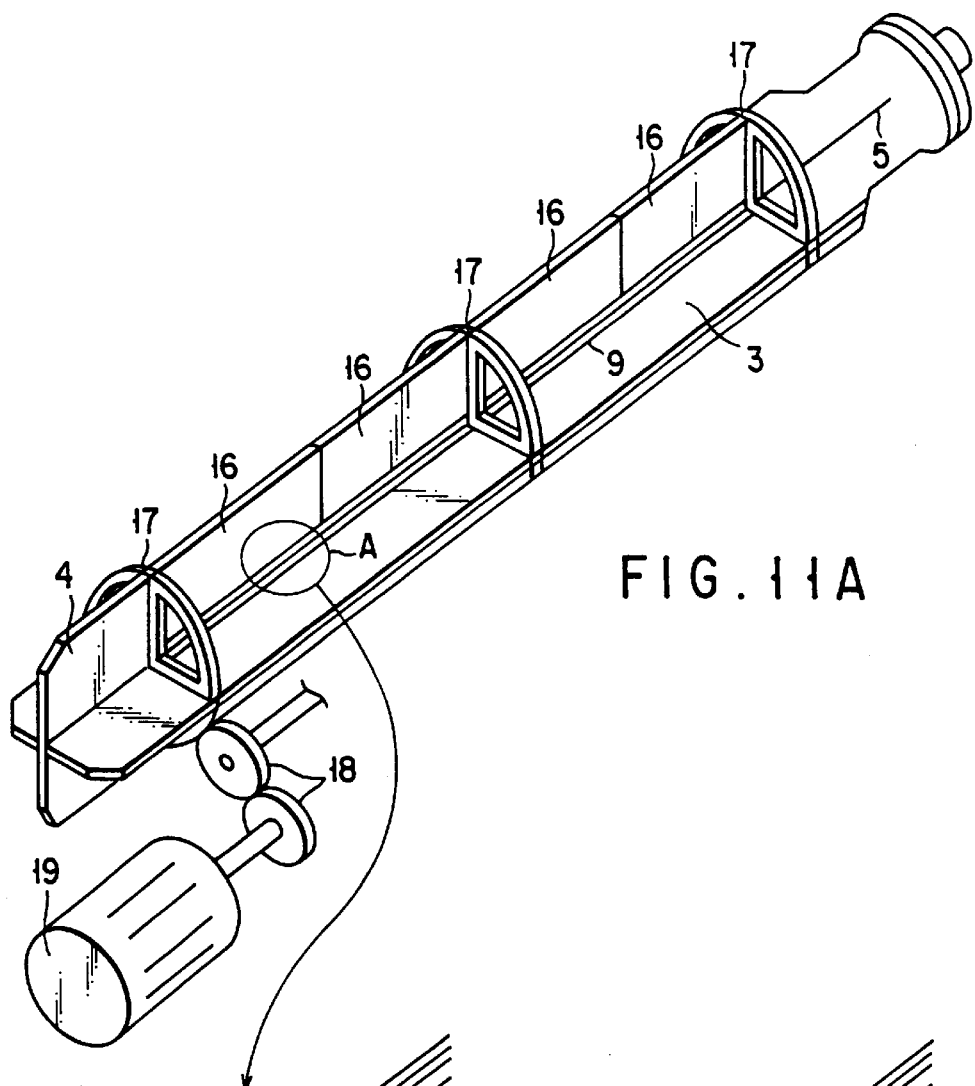
FIG. 11A is a perspective view showing a set state of the entire fixing jigs.
Figure 11D:
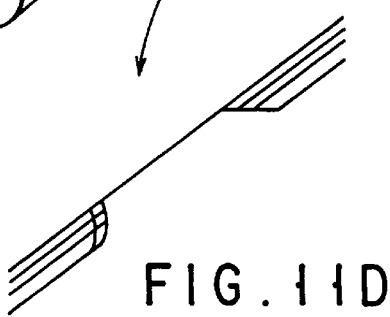
FIG. 11D is a detailed diagram showing an example of a portion A.
Figure 11E:
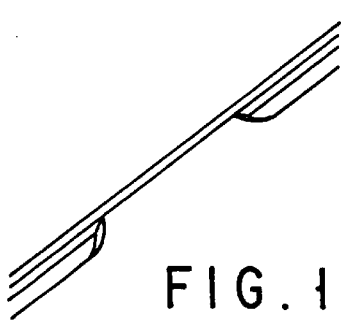
FIG. 11E is a detailed diagram showing another example of the portion A.
Figure 11B:
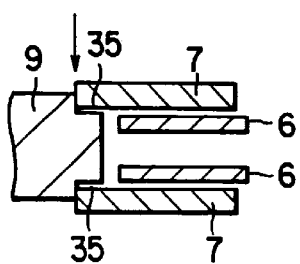
FIG. 11B is a cross sectional view of an example of the control rod to which fixing jigs are set.
Figure 11C:
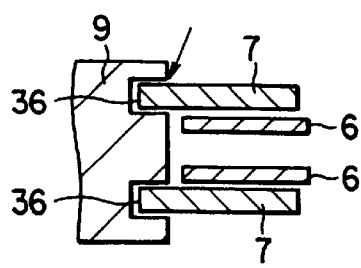
FIG. 11C is a cross sectional view of another example of the control rod to which fixing jigs are set.

FIGS. 11A to 11C show a state in which these elements are set to fixing jigs 17.

As shown in FIGS. 11A to 11C, the blades 3, the handles 4 and the lower-blades 5 are set to the tie rod 9 with at least three fixing jigs 17. Thus, the control rod 2 is assembled (S37). In this case, the fixing jig 17 is divided into two equal parts of upper and lower portions, as shown in FIG. 12. The four blades 3 are set in the upper half portion 17a and the lower half portion 17b and the crisscross tie rod 9 is set at the center of the portions. The fixing jig 17 near the handles 4 has a toothed portion on its circumferential surface. The toothed portion meshes with a gear 18 which is connected to a motor 19. A turning force is transmitted to the fixing jig 17 by the motor 19, so that the work position can be changed.

The tie rod 9 and the blades 3 are not entirely grooved along their overall lengths. As shown in FIG. 11D, the length of the welding groove is about 3 to 8 cm. In the portions which are not welded, the sheath 7 and the tie rod 9 are separated to allow water to flow, i.e., coolant.

Further, as shown in the cross-sectional view of FIG. 11B, the tie rod 9 has sockets 35 to make the positioning with the sheath 7 easy. The position indicated by the arrow in the drawing is grooved.

According to another method, as shown in FIG. 11C, the tie rod 9 may have two slits 36. In this method, when the blade 3 and the tie rod 9 are welded by a laser beam, the laser beam is irradiated in a state where projected portions of the blade 3 is inserted in the sits 36. In this case, as shown in FIG. 11C, the laser beam is radiated, targeted at the position indicated by the arrow, i.e., the boundary between the blade 3 and the tie rod 9.

With this method, since the blade 3 and the tie rod 9 are fixed securely, the groove line is prevented from deviating and the laser beam can be irradiated to the groove line easily and reliably.

Figure 13:
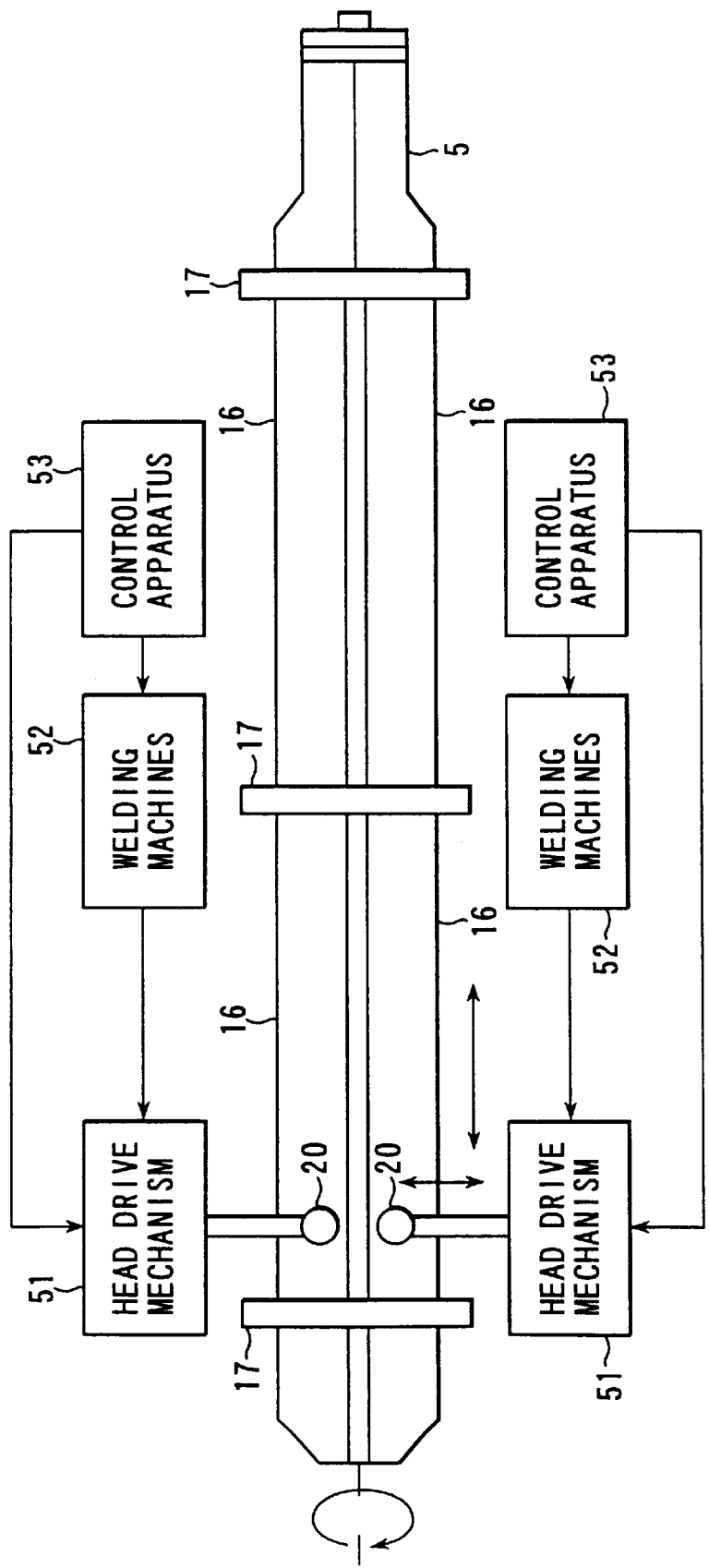
FIG. 13 is a plan view showing a system structure used in a case where the blades are welded to a tie rod by means of two welding machines.

FIG. 13 is a plan view showing a system structure of the components of the control rod 2 set as described above, used in a case where the blades 3 are welded to the tie rod 9 by means of two welding machines.

In FIG. 13, a head drive mechanism 51 drives the work head 20 in radial and longitudinal directions. A welding machine 52 welds the end face of the blade 3 to the tie rod 9 via the head drive mechanism 51. A control apparatus 53 controls the welding machine 52 and the head drive mechanism 51.

Next, the tie rod 9 is welded (S38). The welding conditions are the same as those shown in FIGS. 5A and 5B. The irradiation position of the laser beam is basically located immediately above the groove. However, it may he deviated from the groove within a range of 2.0 mm to secure a penetration bead.

If the bead width is small, laser beams may be irradiated several times so as to lap over one another, immediately above the groove or in a range within 2 mm from the groove. Further, to increase the bead width, the laser beam may be moved circularly. In either case, the method of welding is the same as the welding of the insertion piece 8 shown in FIGS. 6A, 7A and 7B. Therefore, the description thereof is omitted.

To reduce the welding deformation, the chillers 16 are set to positions which do not interfere with the work heads 20. In this case, they are set to the blades 3 located in upper and lower portions along the vertical direction.

The handles 4 and the lower-blades 5 are also welded by means of the laser beam at the same time (S39). The welded surfaces are smoothed with the wire brush (S40). Thus, production of the control rod 2 is completed.

As described above, according to the first embodiment of the present invention, in the method for manufacturing the control rod 2 of the nuclear reactor, the sheath 7 is bent, after the weep holes, the piece-inserting holes and the periphery of the sheath are cut. The neutron absorbers 6 and the insertion pieces 8 are inserted in the bent sheath 7. The piece-inserting holes and the insertion pieces 8 are welded together by the laser beam, thereby forming an integral blade 3. The blades 3 and the tie rod 9 are welded together by the laser beam. Thereafter, the blades 3 and the handles 4 are also welded by the laser beam. Further, after the blades 3 and the lower-blades 5 are welded by the laser beam, the welded portions are finished with a wire brush.

Thus, the YAG laser beam is used to weld the control rods 2 of the nuclear reactor, thereby suppressing the heat input in the welding time and the deformation after the process. Moreover, since the process speed of welding can be increased as compared to the TIG welding, the productivity can be improved.

Second Embodiment

FIG. 14 is a flowchart for explaining a method for manufacturing a control rod 2 for a nuclear reactor according to a second embodiment of the present invention. Components of the control rod 2 are described with reference to FIG. 2. In this embodiment, Hf is used as neutron absorbers 6.

First, weep holes for cooling the neutron absorbers 6 (S41) and holes for setting insertion pieces 8 to secure a space between the neutron absorbers 6 and a sheath 7 (S42) are formed by cutting the sheath 7 by the laser beam. Thereafter, the periphery of the sheath 7 is also cut by the laser beam (S43).

The laser beam is used to cut the periphery of the sheath and the holes in order to keep the accuracy high. Holes may be made by punshing or shearing instead of using a laser beam. After the cutting, it is preferable that scribing is performed by means of a laser beam to confirm the bent position.

Then, the sheath 7 is C-shaped by bending (S44). The insertion pieces 8 and the neutron absorbers 6 are inserted inside the C shape, thereby assembling a blade 3 (S45). Unlike in the first embodiment, however, the insertion pieces 8 are not welded by the laser beam, but only provisional TIG welding is carried out.

In this state, four blades 3 are set to the tie rod 9. Handles 4 and lower-blades 5 are also set. The set state is as shown in FIGS. 11 to 11C. The blades 3, the handles 4 and the lower-blades 5 are set to the tie rod 9 with at least three fixing jigs 17. Thus, the control rod 2 is assembled (S46). In this case, the fixing jig 17 is divided into two equal parts of upper and lower portions, as shown in FIG. 12. The respective parts are set between the upper half portion 17a and the lower half portion 17b.

The tie rod 9 has sockets 35 to make the positioning with the sheath 7 easy. The boundary between the tie rod 9 and the sheath 7 is grooved.

Next, the tie rod 9 is welded by a laser (S47). The welding conditions are the same as those shown in FIGS. 5A and 5B. The irradiation position of the laser beam is basically located immediately above the groove. However, it may be deviated from the groove within a range of 2.0 mm to secure a penetration bead.

If the bead width is small, laser beams may be irradiated several times so as to lap over one another, immediately above the groove or in a range within 2 mm from the groove. Further, to increase the bead width, the laser beam may be moved circularly. In either case, the method of welding is the same as that described with reference to FIGS. 5A and 5B and 6A to 6F. Therefore, the description thereof is omitted.

To reduce the welding deformation, the chillers 16 are set to positions of the blades 3 which do not interfere with the work heads 20.

The handles 4 and the lower-blades 5 are also welded by means of the laser beam at the same time (S48). Then, the welded surfaces are smoothed with a wire brush (S49). Thereafter, the insertion pieces 8 are welded by the laser beam (S50), and the welded surface is smoothed with the wire brush (S51). Thus, production of the control rod 2 is completed.

According to the second embodiment of the present invention, the same effect and advantage as those of the first embodiment can be obtained.

Third Embodiment

FIG. 15 is a flowchart for explaining a method for manufacturing a control rod 2 for a nuclear reactor according to a third embodiment of the present invention. Components of the control rod 2 are described with reference to FIG. 2. In this embodiment, $B_4C$ is used as neutron absorbers 6. The control rod 2 using $B_4C$ is characterized in that an insertion piece 8 to keep constant the gap between the sheath 7 is not used.

First, weep holes for cooling the neutron absorbers 6 are formed by cutting the sheath 7 by a laser beam. Thereafter, the periphery of the sheath 7 is cut (S61).

The laser beam is used to cut the periphery of the sheath 7 and the holes in order to keep the accuracy high. Holes may be made by punching or shearing instead of using a laser beam. After the cutting, it is preferable that scribing is performed by means of a laser beam to confirm the bent position.

Then, the sheath 7 is C-shaped by bending (S62). The neutron absorbers 6 are inserted inside the C shape, thereby assembling a blade 3 (S63).

In this state, four blades 3 are set to the tie rod 9. Handles 4 and lower-blades 5 are also set. The set state is as shown in FIGS. 11A to 11C. The blades 3, the handles 4 and the lower-blades 5 are set to the tie rod 9 with at least three fixing jigs 17. In this case, the fixing jig 17 is divided into two equal parts of upper and lower portions, as shown in FIG. 12. The respective parts are set between the upper half portion 17a and the lower half portion 17b. Thus, the control rod 2 is assembled (S64).

The tie rod 9 has sockets 35 to make the positioning with the sheath 7 easy. The boundary between the tie rod 9 and the sheath 7 is grooved.

Next, the tie rod 9 is welded (S65). The welding conditions are the same as those shown in FIGS. 5A and 5B. The irradiation position of the laser beam is basically located immediately above the groove. However, it may be deviated from the groove within a range of 2.0 mm to secure a penetration bead.

If the bead width is small, laser beams may be irradiated several times so as to lap over one another, immediately above the groove or in a range within 2 mm from the groove. Further, to increase the bead width, the laser beam may be moved circularly. In either case, the method of welding is the same as that described with reference to FIGS. 6A to 6F and FIGS. 7A and 7B. Therefore, the description thereof is omitted.

To reduce the welding deformation, the chillers 16 are set to positions of the blades 3 which do not interfere with the work heads 20.

The handles 4 and the lower-blades 5 are also welded by means of the laser beam at the same time. Then the welded surfaces are smoothed with a wire brush (S66). Thus, production of the control rod 2 is completed.

According to the third embodiment of the present invention, the same effect and advantage as those of the first and second embodiments can be obtained.

Fourth Embodiment

Figure 16:
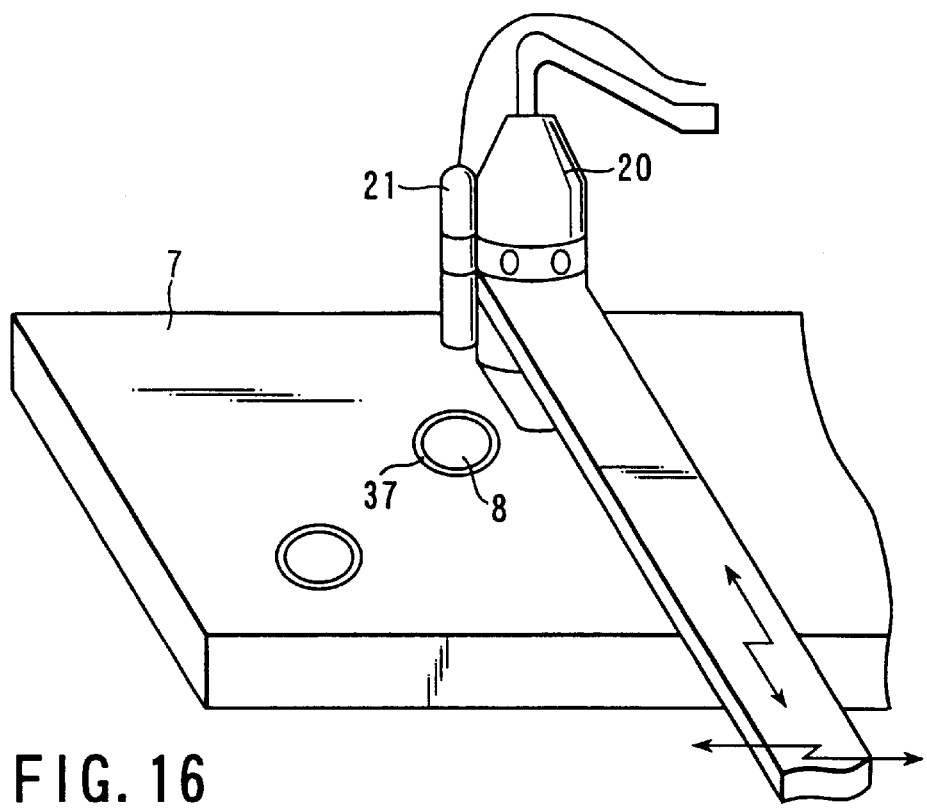
FIG. 16 is a schematic structural diagram showing an apparatus used in welding of insertion pieces of an apparatus for manufacturing a control rod for a nuclear reactor according to a fourth embodiment of the present invention.

FIG. 16 schematically shows an apparatus used in welding of insertion pieces according to a fourth embodiment of the present invention.

As shown in FIG. 16, an insertion piece 8 can be seen through a piece-inserting hole 37 from above the sheath 7. Therefore, the piece-inserting hole 37 is confirmed through a CCD camera 21 mounted on the work head 20.

Figure 17:
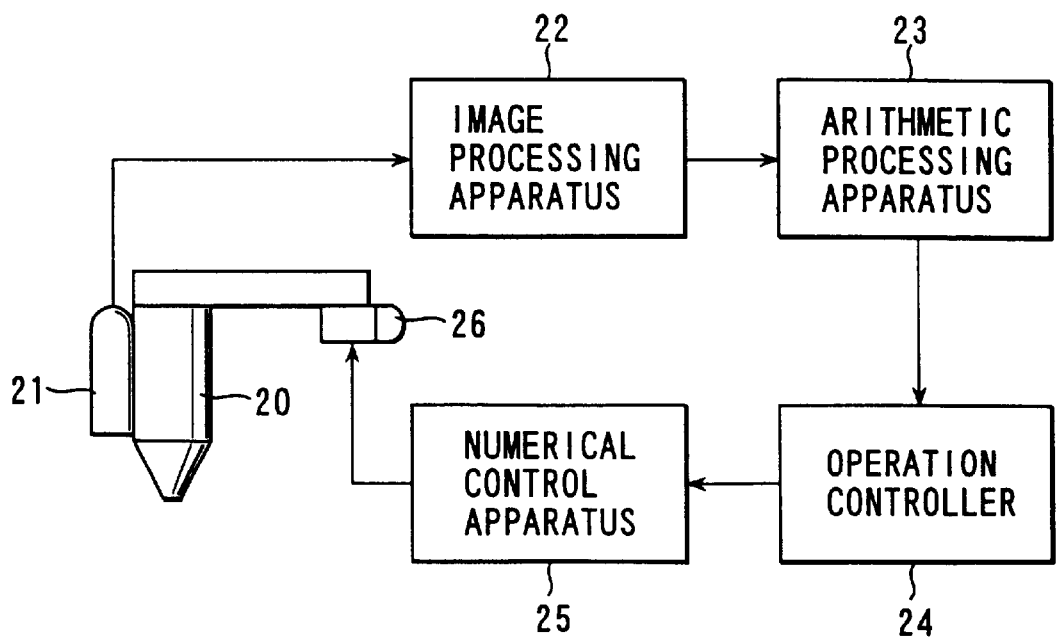
FIG. 17 is a block diagram showing a drive control system in the fourth embodiment.

FIG. 17 is a block diagram showing an automatic insertion piece welding apparatus. Image information of the piece-inserting hole 37 recognized by a CCD camera 21 as shown in FIG. 16 is first converted to shape information by an image processing apparatus 22, and the coordinates of the center of a circle are recognized. Coordinate information is input to an arithmetic processing apparatus 23. The arithmetic processing apparatus 23 compares the coordinates with coordinates of the center of the piece-inserting hole 37 prestored as work data, so that the amount of deviation of the holes is detected. The information is fed back to a numerical control apparatus 25 via an operation computer 24, thereby driving an NC servo motor 26.

Figure 18:
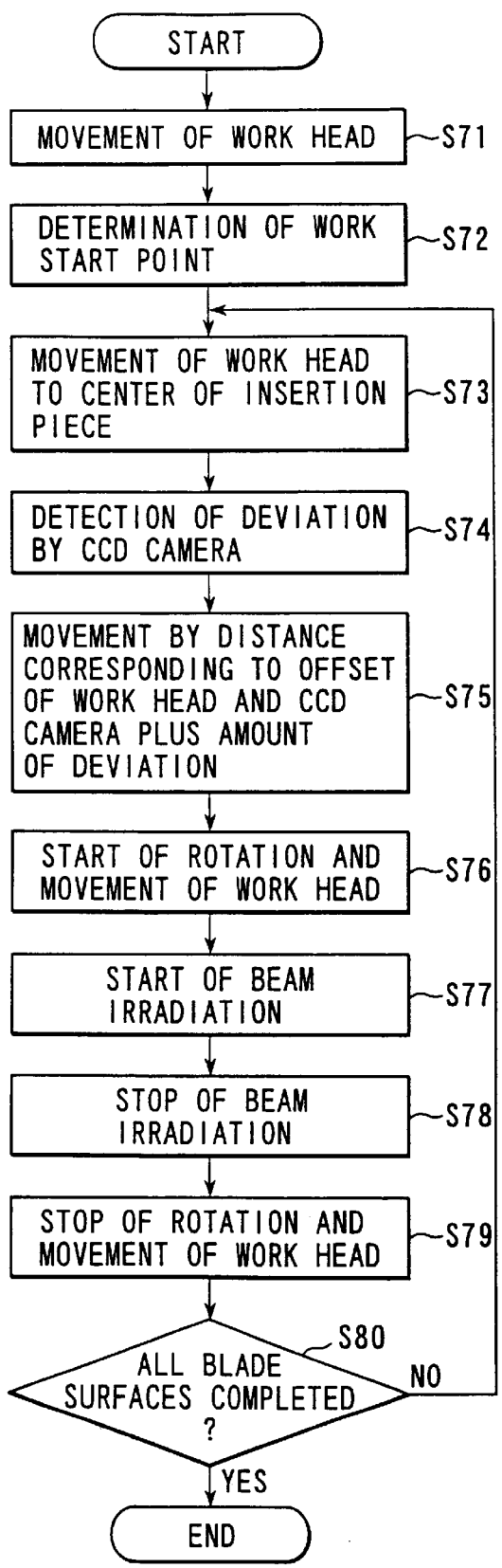
FIG. 18 is a diagram showing a sequence of automatic insertion piece welding in the fourth embodiment.

FIG. 18 shows a sequence of automatic insertion piece welding.

Referring to FIG. 18, first, the work head 20 is moved (S71) and the work start point is determined (S72). The work start point of the CCD camera 21 is also determined. The work head 20 is moved to the center of an insertion piece 8 (S73), and positional deviation is detected by the CCD camera 21, the image processing apparatus 22 and the arithmetic processing apparatus 23 (S74). The work head 20 is moved by a distance corresponding to the amount of this positional deviation plus the offset of the work head 20 and the CCD camera 21 (S75).

In this state, the work head 20 starts rotating and moving (S76). When irradiation of the beam is started (S77), welding is started. When the welding is ended, beam irradiation is stopped (S78) and rotation and movement of the work head 20 is also stopped (S79).

When the welding of the insertion pieces 8 on one surface of the blade 3 is completed, the surfaces of the blade 3 are changed and the insertion pieces 8 on the other surface is welded. This operation is repeated, until that the insertion pieces 8 on all surfaces of the blades 3 are welded (S80).

Welding of the insertion pieces 8 is described above. Welding of the tie rod 9 is carried out in the same manner by means of the aforementioned apparatus shown in FIGS. 16 and 17.

Figure 19:
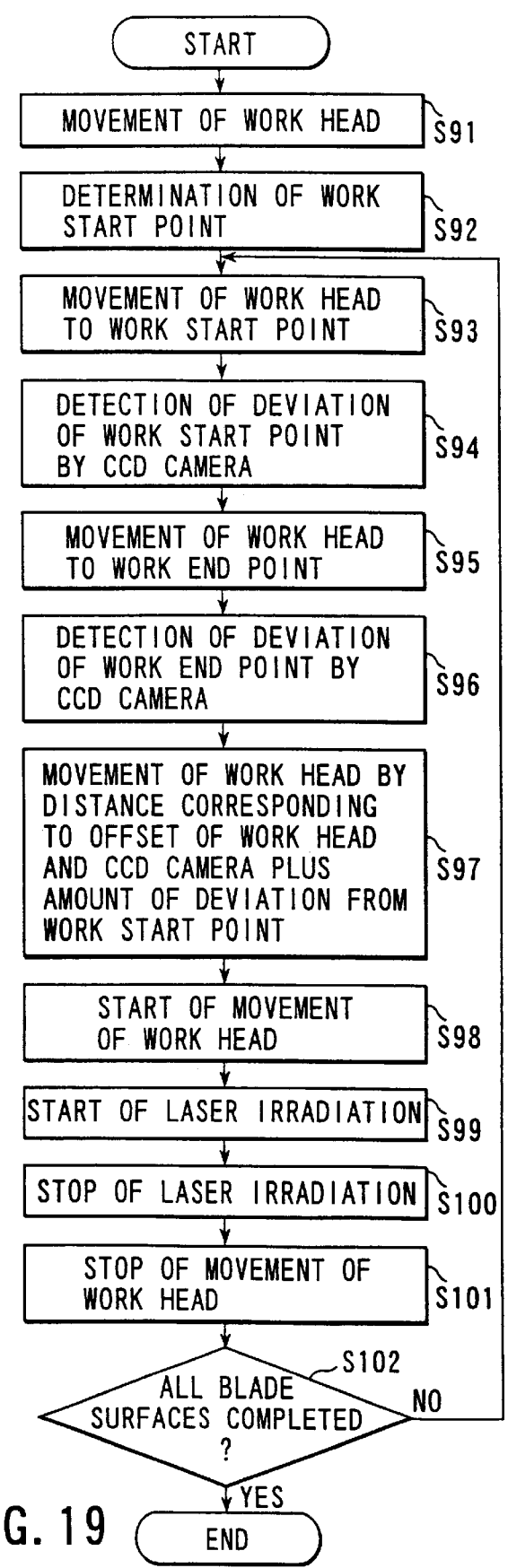
FIG. 19 is a diagram showing a sequence of automatic tie rod welding in the fourth embodiment.

FIG. 19 shows a sequence of automatic tie rod welding.

Referring to FIG. 19, first, the work head 20 is moved (S91) and the work start point is determined (S92). Then, as shown in the enlarged views of FIGS. 11B and 11C, at the welding portion between the tie rod 9 and the sheath 7, projections are formed on the sheath 7 side and sockets 35 are formed on the tie rod 9 side. The work head 20 is moved to one end of the projections of the sheath 7, i.e., the work start point (S93). The positional deviation of the work start point is detected by the CCD camera 21, the image processing apparatus 22 and the arithmetic processing apparatus 23 (S94). In the same manner, the work head 20 is moved to the other end of the projections of the sheath 7, i.e., the work end point (S95). The positional deviation of the work end point is detected by the CCD camera 21, the image processing apparatus 22 and the arithmetic processing apparatus 23 (S96). Then, the work head 20 is moved by a distance corresponding to the amount of deviation of the work start point and the offset of the work head 20 and the CCD camera 21 (S97).

In this state, movement of the work head 20 is started (S98). When irradiation of the beam is started, welding is started (S99). When the welding is ended, beam irradiation is stopped (S100) and movement of the work head 20 is also stopped (S101).

When the welding of the tie rod 9 on one surface of the blade 3 is completed, the surfaces of the blade 3 are exchanged (S102) and welding of the other seven surfaces of the tie rod 3 is successively performed.

In the first and second embodiments descried above, in the case of welding of a comparatively narrow bead width of 0.1 to 2.0 mm, when the laser irradiation position is greatly deviated from the groove position, it becomes difficult to carry out welding by means of a laser beam.

According to the fourth embodiment, to solve this problem, the groove position is detected by the CCD camera 21 and the image processing apparatus 22 mounted on the work head 20, thereby correcting the laser beam irradiating position. As a result, the welding of the insertion pieces 8 and the tie rod 9 can be automatically carried out with high accuracy.

As described above, according to the fourth embodiment of the present invention, the CCD camera 21 is mounted on the work head 20 and the CCD camera 21 in its entirety is moved by numerical control (NC) to the groove position as designed. An image near the welding portion is picked up by the CCD camera 21. The image information is supplied to the image processing apparatus 22. The image processing apparatus 22 detects the actual groove position from the image, i.e., the coordinates of the center of the insertion piece 8 from the groove position in the case of welding the piece-inserting hole 37 of the sheath 7 and the insertion piece 8.

In the case of welding the blades 3 and the tie rod 9, welding of the blades 3 and the handles 4 or welding of the blades 3 and the lower-blades 5, the work start and end points of the welding are detected from the groove position. The arithmetic processing apparatus 23 compares the actual groove position with the groove position as designed. As a result, the positional deviation of the laser beam irradiation is calculated based on the above. After the work head 20 is moved by a distance corresponding to the amount of the positional deviation of the laser beam irradiation plus the offset of the work head 20 and the CCD camera 21, the laser beam is irradiated.

Therefore, even if there is a difference between the groove position as designed and the actual groove position, the groove line is melted reliably, the penetration bead on the rear surface is secured, and the welding process is performed automatically. As a result, since the heat input in the welding time is kept low, the deformation after the process is suppressed. Moreover, since the process speed of welding is increased, the productivity can be improved.

Fifth Embodiment

Figure 20:
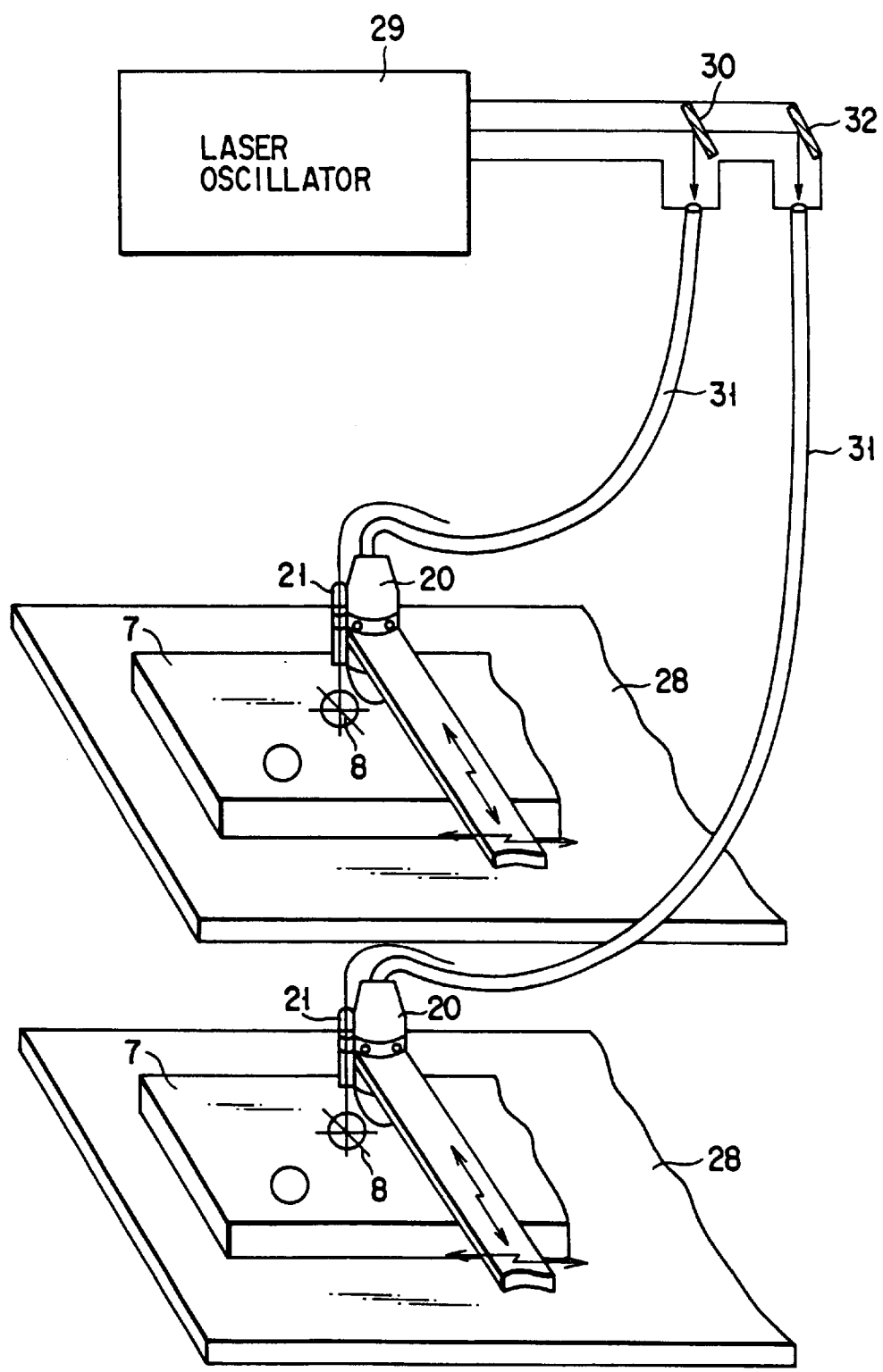
FIG. 20 is a schematic structural diagram showing an apparatus used in welding of insertion pieces according to a fifth embodiment of the present invention.

FIG. 20 schematically shows an apparatus used in welding of insertion pieces 8 according to a fifth embodiment of the present invention. Since the structure of the work head 20 is the same as that shown in FIG. 16, the same component is identified by the same reference symbol.

As shown in FIG. 20, when insertion pieces 8 are welded to sheathes 7 mounted on at least two work tables 28, the work heads 20 are set on the respective sheathes 7.

The laser beam output from a laser oscillator 29 provided as a welding machine is reflected by a variable mirror 30 arranged in the optical path thereof. The laser beam is guided to one of the work heads 20 through an optical fiber 31. Then, the laser beam is irradiated on a welding position from the work head 20.

To guide the laser beam to the other work head 20, the variable mirror 30 is moved to a position which does not interfere with the laser beam, so that the laser beam is reflected by a fixed mirror 32 arranged in the laser optical path and guided to the other work head 20 through an optical fiber 31. Then, the laser beam is irradiated on a welding portion by the work head 20.

In this case, if so-called time sharing light division is feasible, that is, the laser beam of one laser oscillator 29 is used for at least two work heads 20 in different time period, the laser oscillator 29 can be efficiently utilized.

The structure for automatically welding an insertion piece 8 based on the image information of the piece inserting-hole 37, recognized by the CCD camera 21 mounted on each work head 20, is the same as that of the third embodiment shown in FIGS. 17 and 18. Therefore, the description thereof is omitted.

With the above apparatus, the welding process can be automatically performed. In addition, the groove line can be melted reliably by adjusting the groove position, and the penetration bead on the rear surface is secured. Further, the welding process can be automatically performed.

Sixth Embodiment

Figures 21, 22:
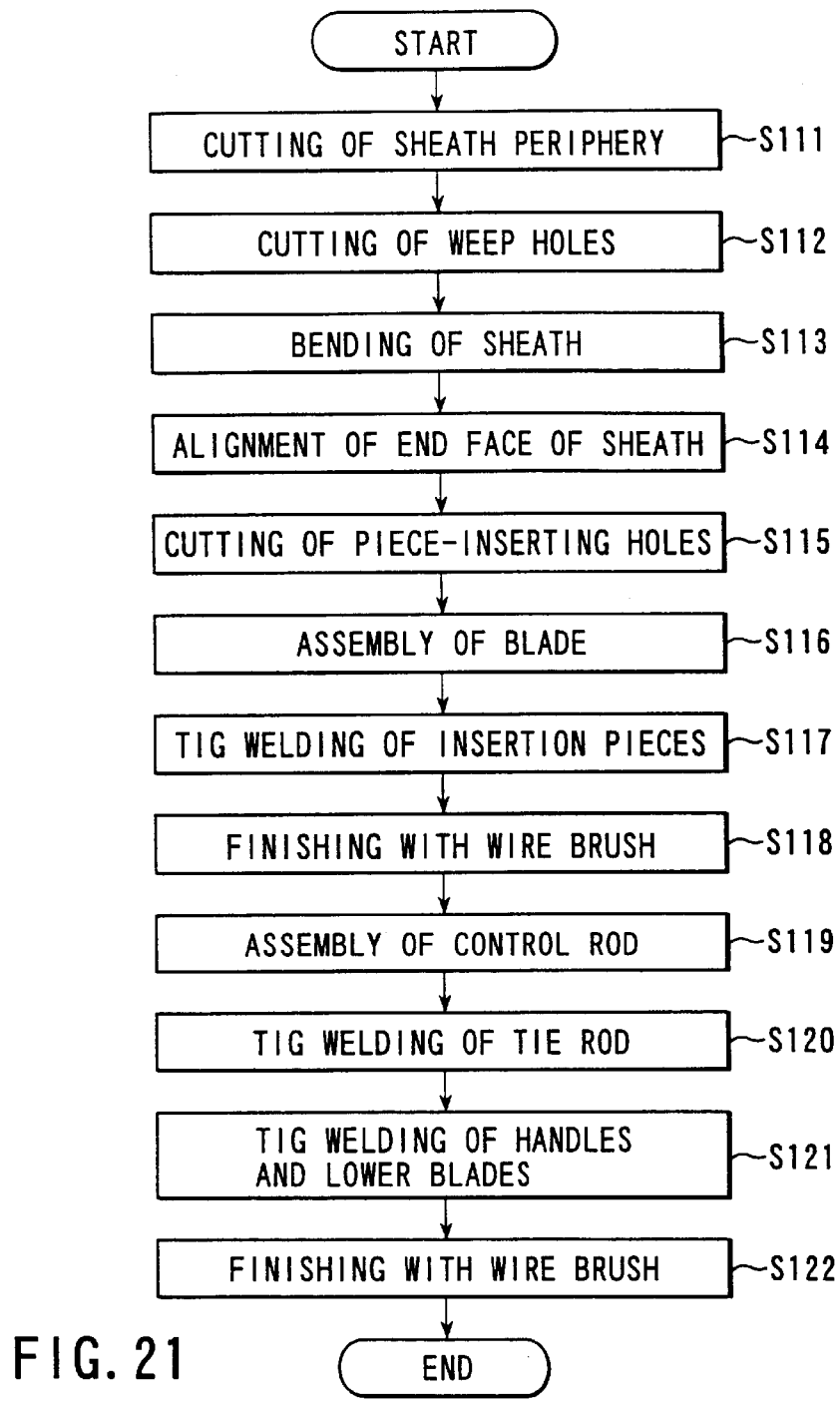
FIG. 21 is a flowchart for explaining a method for manufacturing a control rod for a nuclear reactor according to a sixth embodiment of the present invention.
FIG. 22 is a diagram showing an example of conditions for welding insertion pieces and a sheath by an automatic TIG welding machine according to the sixth embodiment.

FIG. 21 is a flowchart for explaining a method for manufacturing a control rod 2 for a nuclear reactor according to a sixth embodiment of the present invention. Components of the control rod 2 are described with reference to FIG. 2. In this embodiment, Hf is used as neutron absorbers 6.

First, the periphery of a sheath 7 is cut by a laser beam (S111). Thereafter, weep holes for cooling the neutron absorbers 6 are formed by cutting the sheath 7 by a laser beam (S112).

The laser beam is used to cut the periphery of the sheath and the holes in order to keep the accuracy high. Holes may be made by punching or shearing instead of using a laser beam. After the cutting, it is preferable that scribing is performed by means of a laser beam to confirm the bent position.

Then, the sheath 7 is C-shaped by bending (S113).

At this time, since the end face of the side of the sheath 7 which is connected to the tie rod 9 tends to be ragged, the ragged portion is cut and removed by the laser beam, thus aligning the end face of the sheath 7 (S114). Alignment may be achieved by shearing instead of using a laser beam.

Then, piece-inserting holes 37 through which insertion pieces 8 are inserted into the internal portion of the C shape are cut (S115). The insertion pieces 8 and the neutron absorbers 6 are inserted into the sheath 7, thereby assembling a blade 3 (S116). Thereafter, the insertion pieces 8 and the sheath 7 are welded by an automatic TIG welding machine (S117).

In this case, the insertion pieces 8 are used to fix the neutron absorbers 6 and secure a space between the sheath 7 and the neutron absorbers 6.

FIG. 22 shows examples of conditions for welding the insertion pieces 8 and the sheath 7 with an automatic TIG welding machine.

As in the case of the first embodiment shown in FIGS. 6A and 6B, the torch position of the TIG welding machine is basically located immediately above a groove of the sheath 7 corresponding to the insertion piece 8. However, it may be deviated from the groove within a range of 0.1 to 3.0 mm as shown in FIGS. 6C and 6D to secure a penetration bead.

Through the methods shown in FIGS. 6A to 6F, a stable bead is obtained, the groove line is reliably melted and the penetration bead on the rear surface is secured.

The jig used in the TIG welding is the same as that shown in FIGS. 10A and 10B, and the description thereof is omitted.

Then, the surface of the welded bead is smoothed with a wire brush (S118).

The neutron absorbers 6 and the insertion pieces 8 are stored in the sheath 7 and integrated with a blade 3. Thereafter, four blades 3 are set to a tie rod 9 and handles 4 and lower-blades 5 are also set, thereby assembling the control rod 2 (S119).

Since the state in which the control rod 2 thus assembled is set to fixing jigs 17 is the same as that shown in FIGS. 11A and 12, the description thereof is omitted.

The tie rod 9 and the blades 3 are not entirely grooved along their overall lengths. As shown in the enlarged views of in FIGS. 11D and 11E, the length of the welding groove is about 3 to 8 cm. In the portions which are not welded, the sheath 7 and the tie rod 9 are separated to allow water as a coolant to flow.

Further, as shown in the cross-sectional view of FIG. 11C, the tie rod 9 has sockets 35 to make the positioning with the sheath 7 easy. The position indicated by the arrow in the drawing is grooved.

As regards the components of the control rod 2 set as described above, the system structure used in the case of welding the blades 3 to the tie rod 9 by two TIG welding machines is the same as that shown in FIG. 13.

The tie rod 9 is welded by means of the TIG welding machines (S120). The welding conditions are the same as those shown in FIG. 22. The position of a TIG welding torch 20 is basically located immediately above a groove. However, it may be deviated from the groove within a range of 3.0 mm to secure a penetration bead.

To reduce the welding deformation, chillers 16 are set to positions which do not interfere with the welding torch 20. In this case, they are set to the blades 3 located in upper and lower portions along the vertical direction.

Then, the handles 4 and the lower-blades 5 are also welded in the same manner (S121). The welded surfaces are smoothed with a wire brush (S122).

As described above, according to the sixth embodiment of the present invention, in the method for manufacturing a control rod of a nuclear reactor, after the periphery of the sheath 7 is cut and the weep holes and piece-inserting holes are cut, the sheath 7 is bent. The neutron absorbers 6 and the insertion pieces 8 are inserted in the bent sheath 7. The piece-inserting holes 37 of the sheath 7 and the insertion pieces 8 are welded by the TIG welding machines, thereby forming an integral blade 3.

The blades 3 and the tie rod 9 are welded by the TIG welding machines, and subsequently, the blades 3 and the handles 4 are also welded by the TIG welding machines. Further, the blades 3 and the lower-blades 5 are welded by the laser beam. Thereafter, the welded portions are smoothed with a wire brush or the like.

Thus, when the control rod 2 of the nuclear reactor is welded, since the heat input in the welding time is kept low by using the two automatic TIG welding machines, the deformation after the process is suppressed. Further, since the TIG welding torches are simultaneously used in place of the two work heads, the productivity can be improved.

Seventh Embodiment

Figure 23:
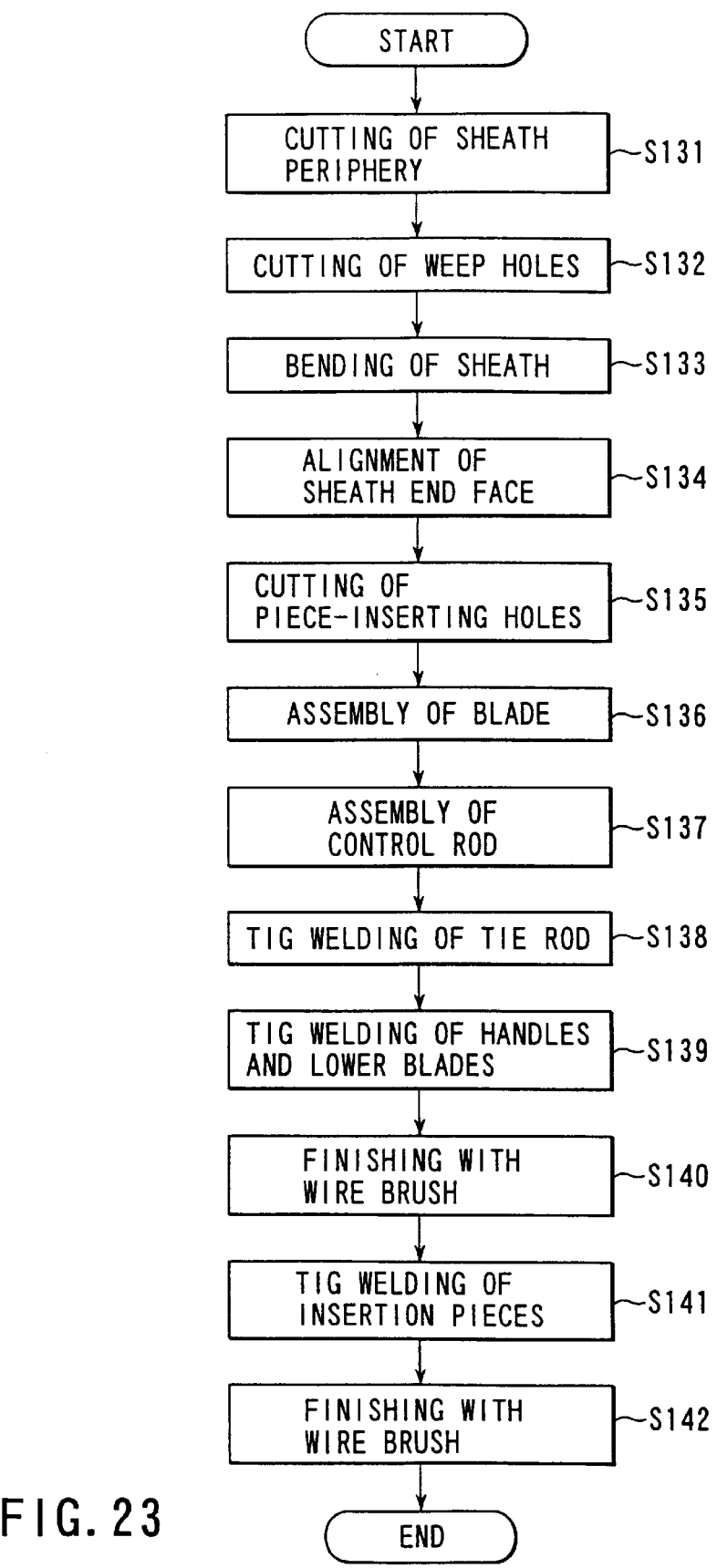
FIG. 23 is a flowchart for explaining a method for manufacturing a control rod for a nuclear reactor according to a seventh embodiment of the present invention.

FIG. 23 is a flowchart for explaining a method for manufacturing a control rod 2 for a nuclear reactor according to a seventh embodiment of the present invention. Components of the control rod 2 are described with reference to FIG. 2. In this embodiment, Hf is used as neutron absorbers 6.

First, the periphery of a sheath 7 is cut by a laser beam (S131). Thereafter, weep holes for cooling the neutron absorbers 6 are formed by cutting the sheath 7 by a laser beam (S132).

The laser beam is used to cut the periphery of the sheath and the holes in order to keep the accuracy high. Holes may be made by punching or shearing instead of using a laser beam. After the cutting, it is preferable that scribing is performed by means of a laser beam to confirm the bent position.

Then, the sheath 7 is C-shaped by bending (S133).

At this time, since the end face of the side of the sheath 7 which is to be connected to the tie rod 9 tends to be ragged, the ragged portion is cut and removed by the laser beam, thus aligning the end face of the sheath 7 (S134). Alignment may be achieved by shearing instead of using a laser beam.

Then, piece-inserting holes are formed by cutting (S135). Insertion pieces 8 and the neutron absorbers 6 are inserted into the sheath 7, thereby assembling a blade 3 (S136). However, the seventh embodiment is different from the sixth embodiment in that welding of the insertion pieces 8 by a laser beam is not carried out but only provisional TIG welding is carried out.

In this state, four blades 3 are set to the tie rod 9, and handles and lower-blades 5 are also set, thereby assembling a control rod 2 (S137).

Since the state in which the four blades are set to the tie rod 9 and the handles 4 and the lower-blades 5 are set and fixed by fixing jigs 17 is the same as that shown in FIGS. 11A and 12, the description thereof is omitted.

Then, the tie rod 9 is welded (S138). The welding conditions are the same as those shown in FIG. 22. The position of a TIG welding torch 20 is basically located immediately above a groove. However, it may be deviated from the groove within a range of 3.0 mm to secure a penetration bead.

To reduce the welding deformation, chillers 16 are set to positions which do not interfere with the welding torch 20.

The handles 4 and the lower-blades 5 are also welded simultaneously by the laser beam (S139). After the welding, the welded surfaces are smoothed with a wire brush (S140). Subsequently, the insertion pieces 8 are welded by the laser beam (S141), and then the surfaces thereof are smoothed (S142).

Thus, in the seventh embodiment of the present invention, the same effect and advantage as those of the sixth embodiment can be obtained.

Eighth Embodiment

Figure 24:
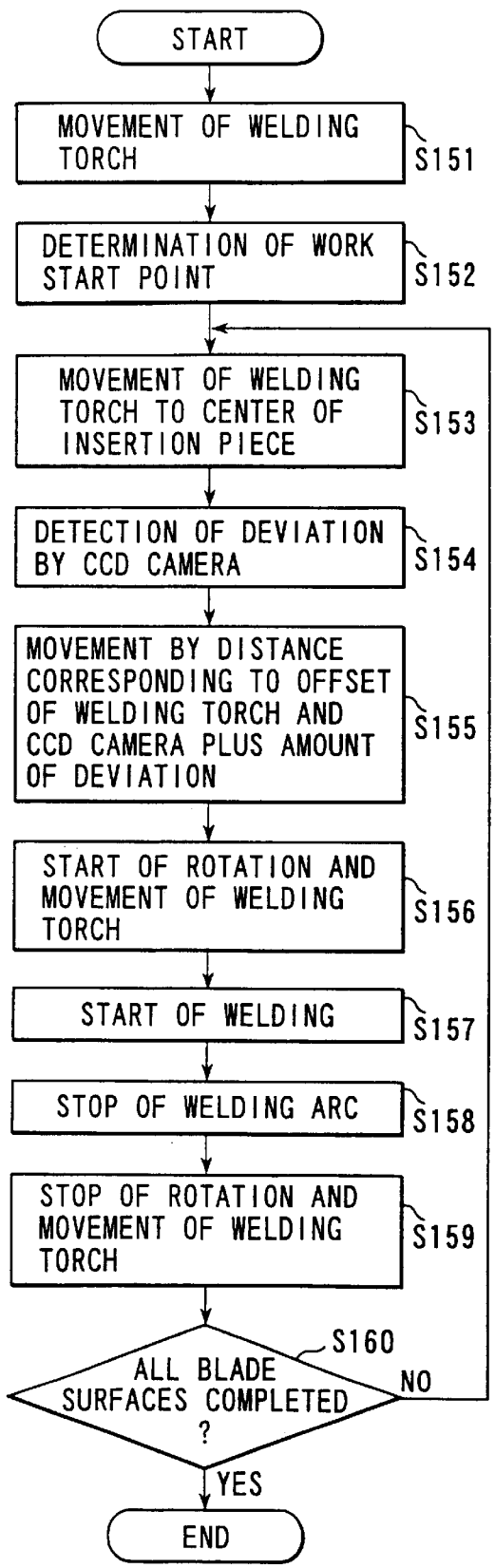
FIG. 24 is a diagram showing a sequence of performing insertion piece welding by means of an automatic TIG welding machine according to an eighth embodiment of the present invention.

FIG. 24 shows a sequence of insertion piece welding by means of an automatic TIG welding machine according to an eighth embodiment of the present invention.

The structure of the automatic insertion piece welding apparatus and the control device thereof are the same as those shown in FIGS. 16 and 17. Therefore, the descriptions thereof are omitted.

Referring to FIG. 24, first, a welding torch 20 in place of the work head is moved (S151) and the work start point is determined (S152). The work start point of the CCD camera 21 is also determined. The welding torch 20 is moved to the center of an insertion piece 8 (S153), and positional deviation is detected by the CCD camera 21, the image processing apparatus 22 and the arithmetic processing apparatus 23 as shown in FIG. 17 (S154). The welding torch 20 is moved by a distance corresponding to the amount of this positional deviation plus the offset of the welding torch 20 and the CCD camera 21 (S155).

In this state, the welding torch 20 starts rotating and moving (S156) and TIG welding is started (S157). When the welding is ended, welding arc is stopped (S158) and rotation and movement of the welding torch is also stopped (S159).

When the welding of the insertion pieces 8 on one surface of the blade 3 is completed, the surfaces of the blade 3 are changed and the insertion pieces 8 on the other surface is welded. This operation is repeated, until the insertion pieces 8 on all surfaces of the blades 3 are welded (S160).

Welding of the insertion pieces 8 is described above. Welding of the tie rod 9 is also carried out in the same manner.

Figure 25:
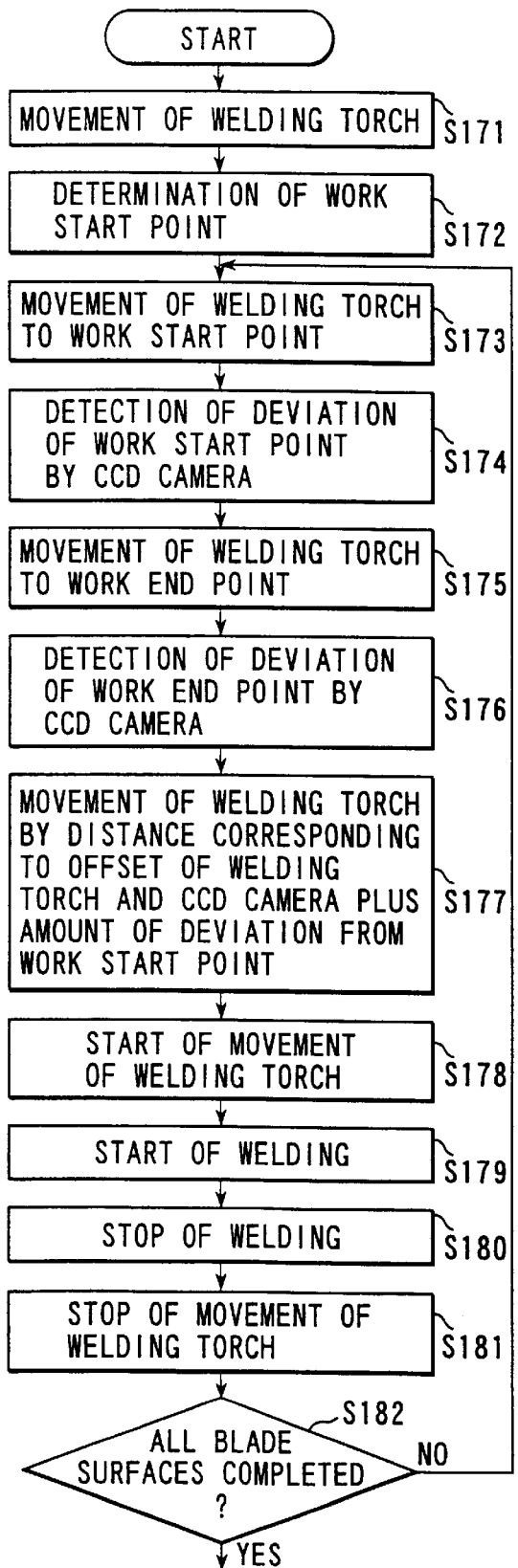
FIG. 25 is a diagram showing a sequence of performing tie rod welding by means of the automatic TIG welding machine according to the eighth embodiment of the present invention.

FIG. 25 shows a sequence of welding the tie rod 9 by an automatic TIG welding machine.

Referring to FIG. 25, first, the welding torch 20 in place of the work head is moved (S171) and the work start point is determined (S172). Then, as shown FIG. 11B, at the welding portion between the tie rod 9 and the sheath 7, projections are formed on the sheath 7 side and sockets 35 are formed on the tie rod 9 side. The welding torch 20 is moved to one end of the projections of the sheath 7, i.e., the work start point (S173). The positional deviation of the work start point is detected by the CCD camera 21, the image processing apparatus 22 and the arithmetic processing apparatus 23 (S174).

In the same manner, the welding torch 20 is moved to the other end of the projections of the sheath 7, i.e., the work end point (S175). The positional deviation of the work end point is detected by the CCD camera 21, the image processing apparatus 22 and the arithmetic processing apparatus 23 (S176). Then, the welding torch 20 is moved by a distance corresponding to the amount of deviation of the work start point and the offset of the work head 20 and the CCD camera 21 (S177).

In this state, movement of the welding torch 20 is started (S178) and TIG welding is started (S179). When the welding is ended, welding arc is stopped (S180) and movement of the welding torch 20 is also stopped (S181).

When the welding of the tie rod 9 on one surface of the blade 3 is completed, welding of the other seven surfaces of the tie rod 9 is successively performed. This operation is repeated, until that the welding of all surfaces of the blades 3 is completed (S182).

In the sixth and seventh embodiments descried above, when the welding torch position is greatly deviated from the groove position, welding itself becomes difficult.

According to the eighth embodiment, to solve this problem, the groove position is detected by the CCD camera 21 and the image processing apparatus 22 mounted on the welding torch 20, so that the position of the welding torch can be corrected. As a result, the welding of the insertion pieces 8 and the tie rod 9 can be automatically carried out with high accuracy.

As described above, according to the eighth embodiment of the present invention, the CCD camera 21 is mounted on the welding torch 20 and the CCD camera 21 in its entirety is moved by numerical control (NC) to the groove position as designed. An image near the welding portion is picked up by the CCD camera 21.

The image information is supplied to the image processing apparatus 22. The image processing apparatus 22 detects the actual groove position, i.e., the coordinates of the center of the insertion piece 8 to be welded. In the case of welding the blades 3 and the tie rod 9, welding of the blades 3 and the handles 4 or welding of the blades 3 and the lower-blades 5, the work start and end points of the welding are detected from the groove position. The arithmetic processing apparatus 23 compares the actual groove position with the groove position as designed. As a result, the positional deviation of the TIG welding torch is calculated. After the welding torch is moved by a distance corresponding to the amount of the positional deviation of the position of the welding torch plus the TIG welding is carried out.

Therefore, even if there is a difference between the groove position as designed and the actual groove position, the groove line is melted reliably, the penetration bead on the rear surface is secured, and the welding process is performed automatically. As a result, since the heat input in the welding time is kept low, the deformation after the process is suppressed. Moreover, since the two welding torches are simultaneously used, the productivity can be improved.

Ninth Embodiment

Figure 26:
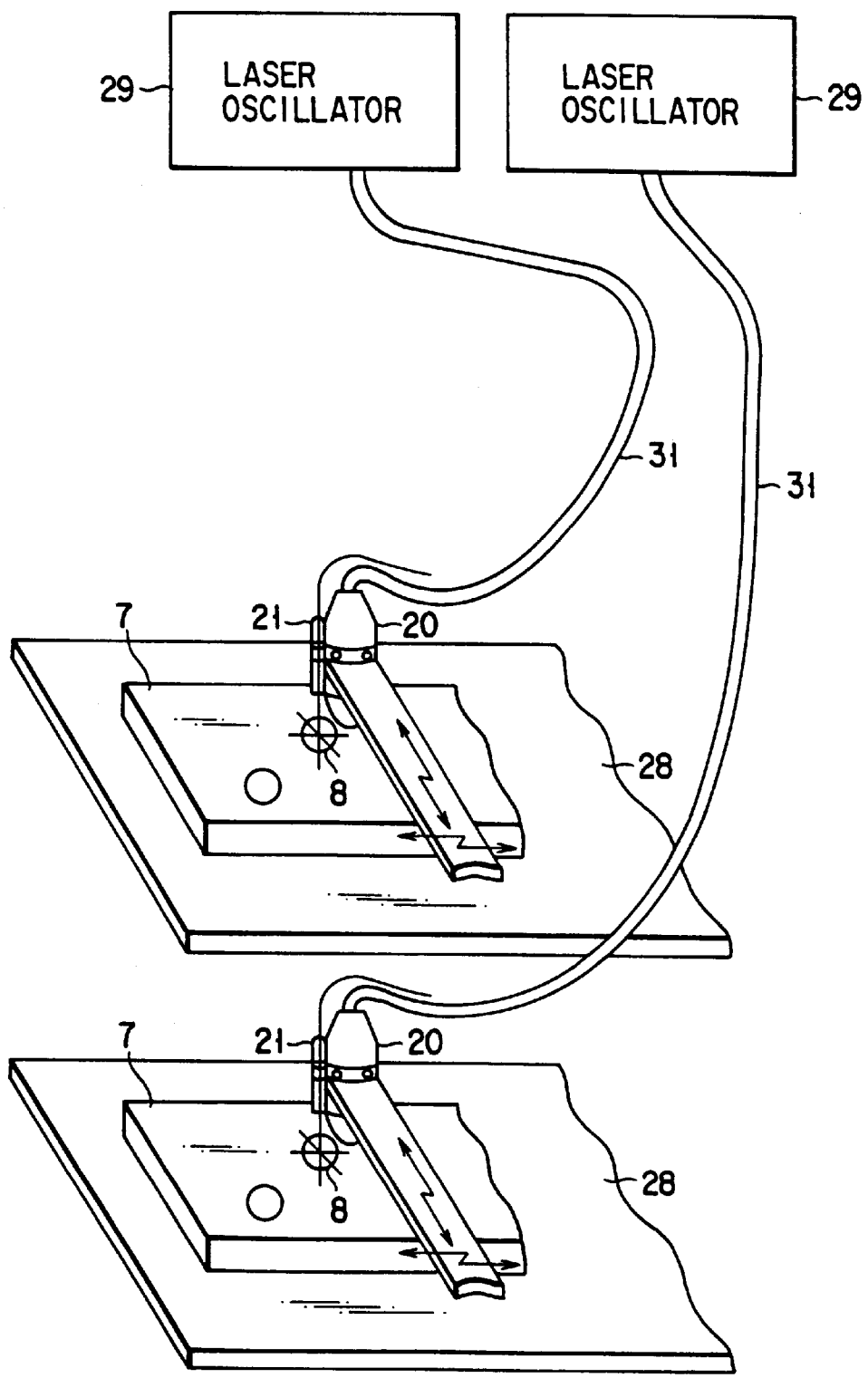
FIG. 26 is a schematic structural diagram showing an apparatus used in welding of insertion pieces according to a ninth embodiment of the present invention.

FIG. 26 schematically shows an apparatus used in welding of insertion pieces according to a ninth embodiment of the present invention. Since the structure of the work head is the same as that shown in FIG. 20, the same component is identified by the same reference symbol.

As shown in FIG. 26, when insertion pieces 8 are welded to sheathes 7 mounted on at least two work tables 28, welding torches 20 of TIG welding machines are set on the respective sheathes 7.

The structure for automatically welding an insertion piece 8 based on the image information of a hole, recognized by the CCD camera 21 mounted on each welding torch, is the same as that of the eighth embodiment shown in FIGS. 17 and 24. Therefore, the description thereof is omitted.

With the above apparatus, the welding process can be automatically performed. In addition, the groove line can be melted reliably by adjusting the groove position, and the penetration bead on the rear surface is secured. Further, the welding process can be automatically performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing a control rod of a nuclear reactor, the control rod comprising a blade including neutron absorbers and sheathes, a tie rod to be fixed to the blade at a first groove, a handle to be fixed to the blade at a second groove and a lower-blade to be fixed to the blade at a third groove, said method comprising:

cutting weep holes for water to cool the neutron absorbers in the sheath and cutting a periphery of the sheath;

bending the sheath cut in the cutting step to a C-shape;

inserting the neutron absorbers in a bent portion of the sheath formed by bending in the bending step;

welding the blade to the tie rod so that the first groove is welded reliably to secure a penetration bead on a rear surface of the sheath by irradiating a laser beam on a first portion deviated from the first groove within a range of 2 mm, the blade to the handle so that the second groove is welded reliably to secure a penetration bead on the rear surface of the sheath by irradiating a laser beam on a second portion deviated from the second groove within a range of 2 mm, and the blade to the lower-blade so that the third groove is welded reliably to secure a penetration bead on the rear surface of the sheath by irradiating a laser beam on a third portion deviated from the third groove within a range of 2 mm; and finishing portions welded in the welding step.

2. A method for manufacturing a control rod of a nuclear reactor according to claim 1, wherein the laser beam is one of a YAG laser beam or a CO2 laser beam.

3. A method for manufacturing a control rod of a nuclear reactor according to claim 1, wherein the welding step comprises performing a TIG welding on a first position deviated from the first groove, a second position deviated from the second groove, and a third position deviated from the third groove within a range of 3 mm.

4. A method for manufacturing a control rod of a nuclear reactor according to one of the claims 1, 2 or 3, wherein the cutting step comprises cutting the weep holes and the sheath with high-pressure nitrogen gas.

5. A method for manufacturing a control rod of a nuclear reactor according to one of the claims 1, 2 or 3, wherein the inserting step comprises aligning ragged end faces of the sheath which are connected to the tie rod by laser cutting with high-pressure nitrogen gas.

6. A method for manufacturing a control rod of a nuclear reactor according to one of the claims 1, 2 or 3, wherein the welding step comprises forming two slits in one of the tie rod, the handle and the lower-blade, inserting projections of the blade in the slits, and irradiating the laser beam on one of a boundary between the blade and the tie rod and a boundary between the blade and the lower-blade.

7. A method for manufacturing a control rod of a nuclear reactor according to one of the claims 1 or 3, wherein the welding step comprises welding the blade by irradiating one of a YAG laser beam or a $CO_2$ laser beam on a position deviated from the first, second, and third grooves toward a thick structure portion whose thickness is greater than a depth of the first, second, and third grooves respectively to form a penetration bead.

8. A method for manufacturing a control rod of a nuclear reactor according to claim 2, wherein the welding step comprises welding the blade by irradiating said one of the YAG laser beam or the $CO_2$ laser beam on a position deviated from the first, second, and third grooves toward a thick structure portion whose thickness is greater than a depth of the first, second, and third grooves respectively to form a penetration bead.

* * * * *